US011226939B2

(12) United States Patent
Tana

(10) Patent No.: US 11,226,939 B2
(45) Date of Patent: Jan. 18, 2022

(54) SYNCHRONIZING CHANGES WITHIN A COLLABORATIVE CONTENT MANAGEMENT SYSTEM

(71) Applicant: Dropbox, Inc., San Francisco, CA (US)

(72) Inventor: Evan Tana, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 155 days.

(21) Appl. No.: 15/859,028

(22) Filed: Dec. 29, 2017

(65) Prior Publication Data

US 2019/0205420 A1 Jul. 4, 2019

(51) Int. Cl.
*G06F 16/178* (2019.01)
*G06Q 10/10* (2012.01)
(Continued)

(52) U.S. Cl.
CPC .......... *G06F 16/178* (2019.01); *G06F 16/164* (2019.01); *G06F 16/168* (2019.01); *G06F 16/176* (2019.01); *G06F 16/183* (2019.01); *G06Q 10/103* (2013.01); *G06F 3/0486* (2013.01)

(58) Field of Classification Search
CPC .... G06F 16/168; G06F 16/178; G06F 16/164; G06F 16/183; G06F 16/176; G06F 16/16; G06F 3/0486; G06F 3/0483; G06F 3/04842; G06F 3/0481; G06F 3/04817; G06F 3/0484; G06F 3/04886; G06F 2203/04803;
(Continued)

(56) References Cited

U.S. PATENT DOCUMENTS

| 5,634,129 | A  | 5/1997 | Dickinson et al. |
| 6,370,567 | B1 | 4/2002 | Ouchi et al.     |

(Continued)

FOREIGN PATENT DOCUMENTS

| AU | 2016201019 A1 | 10/2016 |
| AU | 2016201472 A1 | 10/2016 |

(Continued)

OTHER PUBLICATIONS

International Search Report & Written Opinion as received in PCT/US2018/04780 dated Oct. 15, 2018.

(Continued)

*Primary Examiner* — Jesse P Frumkin
(74) *Attorney, Agent, or Firm* — Keller Jolley Preece

(57) ABSTRACT

The present disclosure is directed toward systems, methods, and non-transitory computer readable media for generating and providing a collaborative content management interface for a group of users. For example, the systems described herein can detect user input to add a header within the collaborative content management interface. The systems can cause a file management system to generate a subfolder that corresponds with the new header in the collaborative content management interface. Conversely, the systems can analyze a file database maintained by a file management system and, in response to user input to initiate a collaborative content management system, generate a collaborative content management interface with graphical elements to represent files and headers to represent subfolders.

20 Claims, 22 Drawing Sheets

(51) Int. Cl.
   *G06F 16/16* (2019.01)
   *G06F 16/176* (2019.01)
   *G06F 3/0486* (2013.01)
   *G06F 16/182* (2019.01)

(58) Field of Classification Search
   CPC .......... G06F 2206/1008; G06F 3/0601; G06F 3/04847; G06Q 10/103
   See application file for complete search history.

(56) References Cited

U.S. PATENT DOCUMENTS

| | | |
|---|---|---|
| 6,505,236 B1 | 1/2003 | Pollack et al. |
| 6,839,741 B1 | 1/2005 | Tsai et al. |
| 6,970,906 B1 | 11/2005 | Parsons et al. |
| 7,039,678 B1 | 5/2006 | Halahmi et al. |
| 7,543,237 B2 | 6/2009 | Kontny et al. |
| 7,689,510 B2 | 3/2010 | Lamkin et al. |
| 7,693,958 B2 | 4/2010 | Teodosiu et al. |
| 7,774,710 B2 | 8/2010 | Krishnan et al. |
| 7,865,394 B1 | 1/2011 | Calloway et al. |
| 8,015,491 B2 | 9/2011 | Shaver et al. |
| 8,117,271 B2 | 2/2012 | McConn et al. |
| 8,122,015 B2 | 2/2012 | Liu et al. |
| 8,122,051 B2 | 2/2012 | Spring et al. |
| 8,161,120 B2 | 4/2012 | Tan et al. |
| 8,214,747 B2 | 7/2012 | Yankovich et al. |
| 8,245,141 B1 | 8/2012 | Fuller et al. |
| 8,250,150 B2 | 8/2012 | Beck et al. |
| 8,316,128 B2 | 11/2012 | Beck et al. |
| 8,332,357 B1 | 12/2012 | Chung |
| 8,341,532 B2 | 12/2012 | Ryan et al. |
| 8,438,185 B2 | 5/2013 | Teranishi et al. |
| 8,533,268 B1 | 9/2013 | Vernon et al. |
| 8,543,926 B2 | 9/2013 | Giles et al. |
| 8,700,719 B1 | 4/2014 | Covitz et al. |
| 8,713,106 B2 | 4/2014 | Spataro et al. |
| 8,745,222 B2 | 6/2014 | Chi et al. |
| 8,793,324 B1 | 7/2014 | Schabes et al. |
| 8,819,587 B1* | 8/2014 | Shrum ................. G06F 16/162 715/810 |
| 8,892,679 B1 | 11/2014 | Destagnol et al. |
| 8,924,876 B1* | 12/2014 | Joyce ................. G06F 16/168 715/769 |
| 8,930,412 B2 | 1/2015 | Nelson et al. |
| 8,977,662 B1* | 3/2015 | Hilliar ................. G06F 16/185 707/829 |
| 8,977,722 B2 | 3/2015 | Tsao |
| 8,990,151 B2 | 3/2015 | Savage et al. |
| 9,002,962 B2 | 4/2015 | Lynch et al. |
| 9,166,954 B2 | 10/2015 | Swineford et al. |
| 9,235,268 B2 | 1/2016 | Arrasvuori et al. |
| 9,240,962 B2 | 1/2016 | Jung et al. |
| 9,251,360 B2 | 2/2016 | Meyer et al. |
| 9,252,973 B1 | 2/2016 | Lin et al. |
| 9,298,355 B1 | 3/2016 | Beausoleil et al. |
| 9,300,609 B1 | 3/2016 | Beausoleil et al. |
| 9,395,892 B1* | 7/2016 | Beausoleil ............. G06F 17/24 |
| 9,395,893 B1 | 7/2016 | Beausoleil et al. |
| 9,542,391 B1 | 1/2017 | Eisner et al. |
| 9,588,979 B2* | 3/2017 | Cueto ................. G06F 3/04883 |
| 9,641,488 B2 | 5/2017 | Mityagin et al. |
| 9,747,297 B2* | 8/2017 | Penangwala ......... G06F 16/137 |
| 9,978,040 B2 | 5/2018 | Lee et al. |
| 9,990,365 B1* | 6/2018 | Kilpatrick ............. G06F 16/119 |
| 10,402,786 B2 | 9/2019 | Lo et al. |
| 2002/0120485 A1 | 8/2002 | Kirkconnell-Ewing et al. |
| 2002/0138582 A1 | 9/2002 | Chandra et al. |
| 2003/0009536 A1 | 1/2003 | Henderson et al. |
| 2003/0018622 A1 | 1/2003 | Chau |
| 2003/0046134 A1 | 3/2003 | Frolick et al. |
| 2003/0131062 A1 | 7/2003 | Miyashita et al. |
| 2003/0135565 A1 | 7/2003 | Estrada et al. |
| 2003/0163490 A1 | 8/2003 | Kitamura |
| 2004/0083480 A1 | 4/2004 | Dodge |
| 2004/0117445 A9 | 6/2004 | Lee et al. |
| 2004/0141508 A1 | 7/2004 | Schoeneberger et al. |
| 2004/0162878 A1 | 8/2004 | Lewis et al. |
| 2004/0187140 A1 | 9/2004 | Aigner et al. |
| 2004/0225647 A1 | 11/2004 | Connelly et al. |
| 2004/0230599 A1 | 11/2004 | Moore et al. |
| 2004/0236639 A1 | 11/2004 | Candadai et al. |
| 2005/0022931 A1 | 2/2005 | Min et al. |
| 2005/0028008 A1 | 2/2005 | Kumar et al. |
| 2005/0091289 A1 | 4/2005 | Shappell et al. |
| 2005/0097440 A1 | 5/2005 | Lusk et al. |
| 2005/0108293 A1 | 5/2005 | Lipman et al. |
| 2005/0151756 A1 | 7/2005 | Miyamoto et al. |
| 2005/0182773 A1 | 8/2005 | Feinsmith |
| 2005/0198125 A1 | 9/2005 | MacLeod et al. |
| 2005/0198299 A1 | 9/2005 | Beck et al. |
| 2005/0222931 A1 | 10/2005 | Mamou et al. |
| 2005/0223315 A1 | 10/2005 | Shimizu et al. |
| 2006/0004685 A1* | 1/2006 | Pyhalammi ............. G06F 16/54 |
| 2006/0020904 A1 | 1/2006 | Aaltonen et al. |
| 2006/0026213 A1 | 2/2006 | Yaskin et al. |
| 2006/0064434 A1 | 3/2006 | Gilbert et al. |
| 2006/0080432 A1 | 4/2006 | Spataro et al. |
| 2006/0101443 A1 | 5/2006 | Nasr |
| 2006/0136821 A1 | 6/2006 | Barabe et al. |
| 2007/0033088 A1 | 2/2007 | Aigner et al. |
| 2007/0050324 A1 | 3/2007 | Trinkel et al. |
| 2007/0067726 A1 | 3/2007 | Flynt et al. |
| 2007/0100829 A1 | 5/2007 | Allen et al. |
| 2007/0101294 A1* | 5/2007 | Fong ................. G06F 16/54 715/838 |
| 2007/0150551 A1 | 6/2007 | Krishnan et al. |
| 2007/0179958 A1 | 8/2007 | Chen et al. |
| 2007/0276795 A1 | 11/2007 | Poulsen et al. |
| 2007/0277098 A1 | 11/2007 | Shahar et al. |
| 2007/0288839 A1 | 12/2007 | Kurosawa et al. |
| 2008/0028323 A1 | 1/2008 | Rosen et al. |
| 2008/0036794 A1 | 2/2008 | Weiser et al. |
| 2008/0077614 A1 | 3/2008 | Roy et al. |
| 2008/0091761 A1 | 4/2008 | Tsao |
| 2008/0120382 A1 | 5/2008 | Heidloff et al. |
| 2008/0140732 A1 | 6/2008 | Wilson et al. |
| 2008/0177994 A1 | 7/2008 | Mayer |
| 2008/0195659 A1 | 8/2008 | Rawle |
| 2008/0201422 A1 | 8/2008 | Peccora et al. |
| 2008/0256458 A1 | 10/2008 | Aldred et al. |
| 2008/0288453 A1 | 11/2008 | Smetters et al. |
| 2009/0013043 A1 | 1/2009 | Tan |
| 2009/0044146 A1 | 2/2009 | Patel et al. |
| 2009/0064284 A1 | 3/2009 | Poston et al. |
| 2009/0131116 A1 | 5/2009 | Tsuchiya et al. |
| 2009/0138808 A1* | 5/2009 | Moromisato .......... G06Q 10/10 715/758 |
| 2009/0172281 A1* | 7/2009 | Jogand-Coulomb ........................ G06F 16/188 711/115 |
| 2009/0177754 A1 | 7/2009 | Brezina et al. |
| 2009/0235182 A1 | 9/2009 | Kagawa et al. |
| 2009/0249244 A1 | 10/2009 | Robinson et al. |
| 2009/0282421 A1 | 11/2009 | Jaffer et al. |
| 2009/0307605 A1 | 12/2009 | Ryan et al. |
| 2009/0307622 A1 | 12/2009 | Jalon et al. |
| 2009/0319694 A1 | 12/2009 | Slezak et al. |
| 2009/0327936 A1* | 12/2009 | Wong .................... G06F 3/0483 715/764 |
| 2010/0024011 A1 | 1/2010 | Fukuoka |
| 2010/0082713 A1 | 4/2010 | Frid-Nielsen et al. |
| 2010/0095198 A1 | 4/2010 | Bultrowicz et al. |
| 2010/0138503 A1 | 6/2010 | Ishikawa et al. |
| 2010/0151431 A1 | 6/2010 | Miller et al. |
| 2010/0180196 A1 | 7/2010 | Matsusaka |
| 2010/0211621 A1 | 8/2010 | Hariharan et al. |
| 2010/0241711 A1 | 9/2010 | Ansari et al. |
| 2010/0262435 A1 | 10/2010 | Smith et al. |
| 2010/0287221 A1 | 11/2010 | Battepati et al. |
| 2010/0299763 A1 | 11/2010 | Marcus et al. |
| 2011/0014524 A1 | 1/2011 | Skotheim et al. |
| 2011/0022662 A1 | 1/2011 | Barber-Mingo et al. |
| 2011/0069643 A1 | 3/2011 | Yoakum et al. |

(56) References Cited

U.S. PATENT DOCUMENTS

| | | |
|---|---|---|
| 2011/0119353 A1 | 5/2011 | Tsao |
| 2011/0145245 A1 | 6/2011 | Choi et al. |
| 2011/0173081 A1 | 7/2011 | Crucs |
| 2011/0202430 A1 | 8/2011 | Narayanan et al. |
| 2011/0214088 A1 | 9/2011 | Sandru et al. |
| 2011/0249024 A1 | 10/2011 | Arrasvuori et al. |
| 2011/0258554 A1 | 10/2011 | Sidenur et al. |
| 2011/0276897 A1 | 11/2011 | Crevier et al. |
| 2012/0054639 A1 | 3/2012 | Shi et al. |
| 2012/0079389 A1 | 3/2012 | Tsao |
| 2012/0089565 A1 | 4/2012 | Jackson |
| 2012/0089610 A1 | 4/2012 | Agrawal et al. |
| 2012/0110515 A1 | 5/2012 | Abramoff et al. |
| 2012/0124092 A1 | 5/2012 | Teranishi et al. |
| 2012/0143917 A1 | 6/2012 | Prabaker et al. |
| 2012/0151379 A1 | 6/2012 | Schultz et al. |
| 2012/0158461 A1 | 6/2012 | Aldrey et al. |
| 2012/0182384 A1 | 7/2012 | Anderson et al. |
| 2012/0185800 A1* | 7/2012 | Hart .............. G06F 3/04817 715/810 |
| 2012/0192086 A1 | 7/2012 | Ghods et al. |
| 2012/0221520 A1 | 8/2012 | Garrett et al. |
| 2012/0284290 A1 | 11/2012 | Keebler et al. |
| 2012/0290531 A1 | 11/2012 | Kallakuri et al. |
| 2012/0296946 A1* | 11/2012 | Goto .............. H04L 67/06 707/827 |
| 2012/0297341 A1 | 11/2012 | Glazer et al. |
| 2012/0311060 A1 | 12/2012 | Beck et al. |
| 2012/0311492 A1* | 12/2012 | Omholt .............. G06Q 10/10 715/804 |
| 2012/0317239 A1 | 12/2012 | Mulder et al. |
| 2012/0331108 A1 | 12/2012 | Ferdowsi et al. |
| 2013/0013560 A1 | 1/2013 | Goldberg et al. |
| 2013/0014023 A1* | 1/2013 | Lee .............. G06Q 10/103 715/751 |
| 2013/0024788 A1 | 1/2013 | Olsen et al. |
| 2013/0054613 A1 | 2/2013 | Bishop |
| 2013/0073971 A1 | 3/2013 | Huang et al. |
| 2013/0080919 A1 | 3/2013 | Kiang et al. |
| 2013/0086506 A1* | 4/2013 | Molander .............. G06F 3/048 |
| 2013/0117376 A1 | 5/2013 | Filman et al. |
| 2013/0124638 A1 | 5/2013 | Barreto et al. |
| 2013/0138506 A1 | 5/2013 | Zhu et al. |
| 2013/0138608 A1 | 5/2013 | Smith |
| 2013/0138723 A1 | 5/2013 | Ku et al. |
| 2013/0173798 A1 | 7/2013 | Micucci et al. |
| 2013/0179799 A1 | 7/2013 | Savage |
| 2013/0191339 A1 | 7/2013 | Haden et al. |
| 2013/0198600 A1 | 8/2013 | Lockhart et al. |
| 2013/0205251 A1 | 8/2013 | Cisler et al. |
| 2013/0212112 A1 | 8/2013 | Blom et al. |
| 2013/0218829 A1 | 8/2013 | Martinez |
| 2013/0227015 A1 | 8/2013 | Mihara et al. |
| 2013/0246901 A1 | 9/2013 | Massand |
| 2013/0254699 A1 | 9/2013 | Bashir et al. |
| 2013/0268895 A1* | 10/2013 | Yamaki .............. G06F 3/04817 715/835 |
| 2013/0275398 A1* | 10/2013 | Dorman .............. G06F 16/1744 707/693 |
| 2013/0275509 A1 | 10/2013 | Micucci et al. |
| 2013/0297317 A1 | 11/2013 | Lee et al. |
| 2013/0297680 A1 | 11/2013 | Smith et al. |
| 2013/0305165 A1 | 11/2013 | Zuber et al. |
| 2013/0311557 A1 | 11/2013 | Motes et al. |
| 2014/0006784 A1 | 1/2014 | Walker et al. |
| 2014/0012836 A1 | 1/2014 | Bercovici et al. |
| 2014/0013246 A1 | 1/2014 | Beechuk et al. |
| 2014/0025509 A1 | 1/2014 | Reisz et al. |
| 2014/0029751 A1 | 1/2014 | Swineford et al. |
| 2014/0047560 A1 | 2/2014 | Meyer et al. |
| 2014/0068401 A1 | 3/2014 | Kirigin |
| 2014/0082073 A1 | 3/2014 | Wable et al. |
| 2014/0082101 A1 | 3/2014 | Wable et al. |
| 2014/0089406 A1 | 3/2014 | Gniffke et al. |
| 2014/0133632 A1 | 5/2014 | Wakai et al. |
| 2014/0136989 A1 | 5/2014 | Choi et al. |
| 2014/0156416 A1 | 6/2014 | Goenka et al. |
| 2014/0164535 A1 | 6/2014 | Lynch et al. |
| 2014/0172925 A1 | 6/2014 | Goldbrenner et al. |
| 2014/0172997 A1 | 6/2014 | Chan et al. |
| 2014/0181697 A1 | 6/2014 | Kirigin |
| 2014/0189818 A1 | 7/2014 | Meyer |
| 2014/0195885 A1 | 7/2014 | Thiruvidam et al. |
| 2014/0208220 A1 | 7/2014 | Watal |
| 2014/0210756 A1 | 7/2014 | Lee et al. |
| 2014/0215551 A1 | 7/2014 | Allain et al. |
| 2014/0215568 A1 | 7/2014 | Kirigin et al. |
| 2014/0222701 A1 | 8/2014 | Loh et al. |
| 2014/0222917 A1 | 8/2014 | Poirier |
| 2014/0229839 A1 | 8/2014 | Lynch et al. |
| 2014/0237464 A1 | 8/2014 | Waterman et al. |
| 2014/0280602 A1 | 9/2014 | Quatrano |
| 2014/0281870 A1 | 9/2014 | Vogel et al. |
| 2014/0282222 A1* | 9/2014 | Eim .............. G06F 3/0482 715/783 |
| 2014/0289351 A1 | 9/2014 | Chen et al. |
| 2014/0289360 A1 | 9/2014 | Mahkovec et al. |
| 2014/0289645 A1 | 9/2014 | Megiddo et al. |
| 2014/0289658 A1 | 9/2014 | Gelernter et al. |
| 2014/0294167 A1 | 10/2014 | Kim et al. |
| 2014/0297759 A1 | 10/2014 | Mody |
| 2014/0298207 A1 | 10/2014 | Ittah et al. |
| 2014/0304618 A1 | 10/2014 | Carriero et al. |
| 2014/0304836 A1 | 10/2014 | Velamoor et al. |
| 2014/0316898 A1 | 10/2014 | Russell et al. |
| 2014/0317544 A1 | 10/2014 | Wang |
| 2014/0344739 A1 | 11/2014 | Yoon et al. |
| 2014/0359023 A1 | 12/2014 | Homsany |
| 2014/0359465 A1 | 12/2014 | Litan et al. |
| 2014/0365263 A1 | 12/2014 | Honeyman et al. |
| 2014/0365432 A1 | 12/2014 | Jain et al. |
| 2014/0372539 A1 | 12/2014 | Zaveri |
| 2014/0372923 A1 | 12/2014 | Rossi et al. |
| 2014/0378063 A1 | 12/2014 | Nathwani et al. |
| 2014/0379647 A1 | 12/2014 | Smith et al. |
| 2014/0380232 A1* | 12/2014 | Sarnoff .............. G06F 3/04847 715/781 |
| 2015/0006596 A1* | 1/2015 | Fukui .............. G06F 16/16 707/831 |
| 2015/0019480 A1 | 1/2015 | Maquaire et al. |
| 2015/0019654 A1 | 1/2015 | Wheeler et al. |
| 2015/0026260 A1 | 1/2015 | Worthley et al. |
| 2015/0026604 A1 | 1/2015 | Mulukuri et al. |
| 2015/0032692 A1 | 1/2015 | Litzenberger |
| 2015/0032829 A1 | 1/2015 | Barshow et al. |
| 2015/0058751 A1 | 2/2015 | Tseng |
| 2015/0074044 A1 | 3/2015 | Metreveli et al. |
| 2015/0074520 A1* | 3/2015 | Muto .............. G06F 3/0416 715/243 |
| 2015/0095799 A1 | 4/2015 | Tsao |
| 2015/0100889 A1 | 4/2015 | Tuchman et al. |
| 2015/0120835 A1 | 4/2015 | Schroeder |
| 2015/0120859 A1 | 4/2015 | Kondo et al. |
| 2015/0134751 A1 | 5/2015 | Meyers, Jr. et al. |
| 2015/0134808 A1 | 5/2015 | Fushman et al. |
| 2015/0135097 A1 | 5/2015 | Carriero et al. |
| 2015/0135300 A1 | 5/2015 | Ford et al. |
| 2015/0148093 A1 | 5/2015 | Huang et al. |
| 2015/0149929 A1 | 5/2015 | Shepherd et al. |
| 2015/0156274 A1 | 6/2015 | Alten et al. |
| 2015/0169566 A1 | 6/2015 | Yang et al. |
| 2015/0188960 A1 | 7/2015 | Alhaidar et al. |
| 2015/0200885 A1 | 7/2015 | Sharp et al. |
| 2015/0213037 A1 | 7/2015 | Baldwin et al. |
| 2015/0286371 A1 | 10/2015 | Degani et al. |
| 2015/0288775 A1 | 10/2015 | Larabie-Belanger |
| 2015/0304265 A1 | 10/2015 | Vincent et al. |
| 2016/0028796 A1 | 1/2016 | Garcia et al. |
| 2016/0034844 A1 | 2/2016 | Kofman |
| 2016/0085421 A1 | 3/2016 | Feeney |
| 2016/0094495 A1 | 3/2016 | Ahuja et al. |
| 2016/0127452 A1 | 5/2016 | Newman et al. |

(56) References Cited

U.S. PATENT DOCUMENTS

| | | | |
|---|---|---|---|
| 2016/0140139 A1* | 5/2016 | Torres | G06Q 10/10 707/610 |
| 2016/0179754 A1* | 6/2016 | Borza | G06Q 10/103 715/247 |
| 2016/0247245 A1 | 8/2016 | Baic et al. | |
| 2016/0259508 A1 | 9/2016 | Eccleston et al. | |
| 2016/0277537 A1 | 9/2016 | Liang et al. | |
| 2016/0283085 A1 | 9/2016 | Beausoleil et al. | |
| 2016/0283502 A1 | 9/2016 | Beausoleil et al. | |
| 2016/0283567 A1 | 9/2016 | Beausoleil et al. | |
| 2016/0285702 A1 | 9/2016 | Beausoleil et al. | |
| 2016/0285795 A1 | 9/2016 | Beausoleil et al. | |
| 2016/0285796 A1 | 9/2016 | Beausoleil et al. | |
| 2016/0285797 A1 | 9/2016 | Beausoleil et al. | |
| 2016/0285817 A1 | 9/2016 | Beausoleil et al. | |
| 2016/0285818 A1 | 9/2016 | Beausoleil et al. | |
| 2016/0285890 A1 | 9/2016 | Beausoleil et al. | |
| 2016/0314473 A1 | 10/2016 | Engles et al. | |
| 2017/0006102 A1 | 1/2017 | Mody et al. | |
| 2017/0046531 A1 | 2/2017 | Roberts | |
| 2017/0139557 A1 | 5/2017 | Heo et al. | |
| 2017/0192656 A1 | 7/2017 | Pedrick et al. | |
| 2017/0220605 A1 | 8/2017 | Nivala et al. | |
| 2017/0220657 A1 | 8/2017 | Nivala et al. | |
| 2017/0249070 A1* | 8/2017 | Chen | G06F 3/0486 |
| 2017/0269805 A1* | 9/2017 | DeMaris | G06Q 10/103 |
| 2017/0285928 A1 | 10/2017 | Beausoleil et al. | |
| 2017/0371891 A1* | 12/2017 | Yazganarikan | G06F 3/0486 |
| 2018/0189735 A1 | 7/2018 | Lo et al. | |

FOREIGN PATENT DOCUMENTS

| | | |
|---|---|---|
| AU | 2016201472 B2 | 12/2016 |
| AU | 2017201395 A1 | 3/2017 |
| AU | 2016201019 B2 | 4/2017 |
| AU | 2017204625 A1 | 7/2017 |
| AU | 2016235983 B2 | 10/2017 |
| AU | 2016236015 B2 | 10/2017 |
| AU | 2016235985 B2 | 6/2018 |
| AU | 2016235984 B2 | 10/2018 |
| CN | 1527226 A | 9/2004 |
| CN | 101689188 A | 3/2010 |
| CN | 102375858 A | 3/2012 |
| CN | 107431631 A | 12/2017 |
| CN | 107438840 A | 12/2017 |
| EP | 2 884 408 A1 | 6/2015 |
| EP | 3073674 A1 | 9/2016 |
| EP | 3251289 A1 | 12/2017 |
| EP | 3251290 A1 | 12/2017 |
| EP | 3251305 A1 | 12/2017 |
| EP | 3251288 B1 | 9/2019 |
| EP | 3073673 | 7/2020 |
| JP | S61279916 A | 12/1986 |
| JP | 2000060803 A | 2/2000 |
| JP | 2000105731 A | 4/2000 |
| JP | 2001202405 A | 7/2001 |
| JP | 2001229282 A | 8/2001 |
| JP | 2002244988 A | 8/2002 |
| JP | 2002297883 A | 10/2002 |
| JP | 2003108503 A | 4/2003 |
| JP | 2003256323 A | 9/2003 |
| JP | 2003316629 A | 11/2003 |
| JP | 2004013267 A | 1/2004 |
| JP | 2004046796 A | 2/2004 |
| JP | 2004355417 A | 12/2004 |
| JP | 2004362118 A | 12/2004 |
| JP | 2005346704 A | 12/2005 |
| JP | 2006092074 A | 4/2006 |
| JP | 2006155550 A | 6/2006 |
| JP | 2006189958 A | 7/2006 |
| JP | 2007072523 A | 3/2007 |
| JP | 2007323561 A | 12/2007 |
| JP | 2009069899 A | 4/2009 |
| JP | 2010079889 A | 4/2010 |
| JP | 2013161481 A | 8/2013 |
| JP | 2013175059 A | 9/2013 |
| JP | 2014134961 A | 7/2014 |
| JP | 2014164717 A | 9/2014 |
| JP | 2015032092 A | 2/2015 |
| JP | 2015056096 A | 3/2015 |
| JP | 2016099894 A | 5/2016 |
| JP | 2016181250 A | 10/2016 |
| JP | 2016184404 A | 10/2016 |
| JP | 6028118 B2 | 11/2016 |
| JP | 2017084356 A | 5/2017 |
| JP | 2017182790 A | 10/2017 |
| WO | WO-2007058207 A1 | 5/2007 |
| WO | WO-2010102296 A1 | 9/2010 |
| WO | WO-2013033144 A2 | 3/2013 |
| WO | WO-2014200634 A1 | 12/2014 |
| WO | WO-2015080798 A1 | 6/2015 |
| WO | WO-2016085822 A1 | 6/2016 |
| WO | WO-2016153676 A1 | 9/2016 |
| WO | WO-2016153735 A1 | 9/2016 |
| WO | WO-2016153736 A1 | 9/2016 |
| WO | WO-2016153737 A1 | 9/2016 |
| WO | WO-2016168748 A1 | 10/2016 |

OTHER PUBLICATIONS

Examination Report No. 4, for Australian Application No. 2017385025, dated Nov. 2, 2020, 4 pages.
Advisory Action from U.S. Appl. No. 14/725,982, dated Apr. 23, 2020, 5 pages.
Advisory Action from U.S. Appl. No. 15/624,615, dated Aug. 28, 2019, 2 pages.
Beliz System, "Making Documents on Google Drive," Digital Documents Laboratories, Jul. 18, 2014, Retrieved from: https://watasu.com/dedoken/cloud/page2.html, 9 pages.
Brady T., et al., "Creating value by delivering integrated solutions," 2005, International Journal of Project Management, 6 pages.
Communication pursuant to Article 94(3) EPC for European Application No. 16720200.1 dated Sep. 30, 2019, 5 pages.
Communication Pursuant to Rules 161(1) and 162 EPC for European Application No. 17804403.8 dated Aug. 6, 2019, 3 pages.
Communication under Rule 71(3) EPC for European Application No. 16711411.5 dated Oct. 18, 2019, 7 pages.
Communication Pursuant to Article 94(3) EPC for European Application No. 17804403.8 dated May 7, 2020, 7 pages.
Communication Pursuant to Article 94(3) EPC for European Application No. 17805064.7 dated Nov. 5, 2019, 4 pages.
Communication under Rule 71(3) EPC for European Application No. 16711412.3 dated Nov. 13, 2019, 7 pages.
Communication under Rule 71(3) EPC for European Application No. 16161853.3 dated Feb. 4, 2020, 7 pages.
Communication under rule 71(3) EPC Intention to Grant for European Application No. 16711412.3 dated Mar. 27, 2020, 7 pages.
Communication under Rule 71(3) EPC of Intention to Grant for European Application No. 16720200.1 dted Jun. 12, 2020, 136 pages.
Corrected Notice of Allowability for U.S. Appl. No. 15/624,615 dated Feb. 6, 2020, 2 pages.
Crucial Works Inc, "Sharing Folders," Apps x Support, Jan. 29, 2013, Retrieved from: https://web.archive,org/web/20130129101828/http://www.appsupport.jp/drive/share-folder on Aug. 29, 2017, 8 pages.
Examination Report No. 1, for Australian Application No. 2017385025, dated Nov. 28, 2019, 5 pages.
Examination Report No. 1, for Australian Application No. 2017385026, dated Nov. 28, 2019, 6 pages.
Examination Report No. 2, for Australian Application No. 2017385025, dated Apr. 30, 2020, 5 pages.
Examination Report No. 2, for Australian Application No. 2017385026, dated Apr. 30, 2020, 5 pages.
Extended European Search Report for Application No. 19195083.1 dated Oct. 31, 2019, 8 pages.
Extended European Search Report for EP Application No. 16161853.3 dated Aug. 18, 2016, 3 pages.

(56) References Cited

OTHER PUBLICATIONS

Extended European Search Report for EP Application No. 16161962.2 dated Aug. 24, 2016, 3 pages.
Extended European Search Report for EP Application No. 19182606.4 dated Aug. 8, 2019, 9 pages.
Extended European Search Report for European Application No. 20167778.8 dated Jul. 7, 2020, 10 pages.
Final Office Action for U.S. Appl. No. 14/725,958 dated Feb. 5, 2020, 26 pages.
Final Office Action from U.S. Appl. No. 14/725,982, dated Feb. 19, 2020, 16 pages.
Final Office Action from U.S. Appl. No. 15/476,688, dated Apr. 16, 2020, 25 pages.
Final Office Action from U.S. Appl. No. 15/476,755, dated Apr. 16, 2020, 29 pages.
Freedman V., et al., "A Collaborative Extensible User Environment for Simulation and Knowledge Management," IEEE, 2015, pp. 280-286.
Google Inc., "View and Create Documents on Android," Mar. 19, 2015, Wayback Machine, Google Docs, downloaded from https://web.archive.org/web/20150319022434/https://support.google.com/docs/answer/3420399 ?hl=en, May 30, 2016, 3 pages.
Hoomey, Estyle Inc., "Google Drive How to Use Leverage Surgery "spreadsheet" that can be used in Excel instead!," Nov. 9, 2013, retrieved from https://web.archive.org/web/20131109104805/http:/1hoomey.net/googledrive-study-4> on Jun. 30, 2016, 18 pages.
Hoomey, Estyle Inc., "How to Use Google Drive's 'Spread Sheet' that is Usable instead of Excel," Nov. 9, 2013, retrieved from https://web.archieve.org/web/20131109104805/http://hoomey.net/googledrive-study-4, on Sep. 15, 2017, 9 pages.
International Preliminary Report on Patentability for PCT Application No. PCT/US16/19052, dated Oct. 5, 2017, 7 pages.
International Preliminary Report on Patentability for PCT Application No. PCT/US16/20117, dated Oct. 5, 2017, 8 pages.
International Preliminary Report on Patentability for PCT Application No. PCT/US16/20124, dated Oct. 5, 2017, 8 pages.
International Preliminary Report on Patentability for PCT Application No. PCT/US16/20132, dated Oct. 5, 2017, 8 pages.
International Search Report and Written Opinion for PCT Application No. PCT/US16/19052, dated Nov. 7, 2016, 9 pages.
International Search Report and Written Opinion for PCT Application No. PCT/US16/20117, dated May 13, 2016, 10 pages.
International Search Report and Written Opinion for PCT Application No. PCT/US16/20124, dated May 24, 2016, 10 pages.
International Search Report and Written Opinion for PCT Application No. PCT/US16/20132, dated May 24, 2016, 9 pages.
International Search Report and Written Opinion for PCT Application No. PCT/US2017/061204 dated Dec. 21, 2017, 9 pages.
International Search Report and Written Opinion for PCT Application No. PCT/US2017/061206 dated Jan. 3, 2018, 11 pages.
"Intralinks VIA," 2015, Retrieved from https://www/intralinks.com/sites/default/files/file_attach/intralinks_via_brochure.pdf, 13 pages.
Iwashi, "How to Use Google Documents," Wind-mill Iwashi Blog, Dec. 17, 2014, retrieved from http://wind-mill.co.jp/iwashiblog/2014/12/google-document/, Mar. 27, 2019, 12 pages.
Mislove A., et al., "POST: A secure, resilient, cooperative messaging system," Conference: Proceedings of HotOS'03: 9th Workshop on Hot Topics in Operating Systems, Lihue (Kauai), Hawaii, USA, May 18-21, 2003, 6 pages.
Non-Final Office Action from U.S. Appl. No. 14/725,942, dated Sep. 27, 2019, 26 pages.
Non-Final Office Action from U.S. Appl. No. 14/725,958, dated Sep. 27, 2019, 25 pages.
Non-Final Office Action from U.S. Appl. No. 14/725,982, dated Sep. 20, 2019, 13 pages.
Non-Final Office Action from U.S. Appl. No. 15/055,566, dated Mar. 5, 2020, 25 pages.
Non-Final Office Action from U.S. Appl. No. 15/476,688, dated Nov. 18, 2019, 23 pages.
Non-Final Office Action from U.S. Appl. No. 15/476,715, dated Oct. 4, 2019, 25 pages.
Non-Final Office Action from U.S. Appl. No. 15/476,755, dated Nov. 29, 2019, 23 pages.
Non-Final Office Action from U.S. Appl. No. 15/624,615, dated Oct. 2, 2019, 12 pages.
Notice of Reasons for Refusal for Japanese Application No. 2018-190286 dated Oct. 4, 2019, 5 pages.
Notice of Allowance from U.S. Appl. No. 14/725,905, dated Oct. 2, 2019, 15 pages.
Notice of Allowance from U.S. Appl. No. 14/726,103, dated Sep. 16, 2019, 2 pages.
Notice of Allowance from U.S. Appl. No. 15/476,688, dated Apr. 30, 2020, 9 pages.
Notice of Allowance from U.S. Appl. No. 15/476,715, dated May 13, 2020, 9 pages.
Notice of Allowance from U.S. Appl. No. 15/476,742, dated Jul. 1, 2020, 9 pages.
Notice of Allowance from U.S. Appl. No. 15/476,755, dated May 20, 2020, 9 pages.
Notice of Allowance from U.S. Appl. No. 15/624,615, dated Dec. 30, 2019, 9 pages.
Notice of Allowance from U.S. Appl. No. 15/395,220, dated May 20, 2019, 7 pages.
Notice of Allowance from U.S. Appl. No. 14/725,905, dated Jan. 10, 2020, 2 pages.
Notice of Reasons for Refusal for Japanese Application No. 2019-508896 dated May 8, 2020, 24 pages.
Notification of the First Office Action and Search Report for Chinese Application No. 201680013771.1 dated Dec. 4, 2019, 12 pages.
Office Action for Australian Application No. 2016235984 dated Mar. 22, 2018, 3 pages.
Office Action for Japanese Application No. 2017-544960 dated Mar. 16, 2018, 10 pages. (English Translation only).
Office Action for U.S. Appl. No. 14/725,942 dated Feb. 5, 2020, 25 pages.
Office Action for U.S. Appl. No. 15/476,742 dated Feb. 5, 2020, 23 pages.
Pundir A K.,"Towards a complexity framework for managing projects," Dec. 31, 2007, 7 pages.
Shimada H., "Online Storage Service having Documents-Editing Functions: Introduction to Google Drive for a Person that Missed the Wave," ITmedia Inc., Feb. 7, 2014, retrieved from internet URL: https://web.archive.org/web/20140207083317/ and http://www.atmarkit.co.jp/ait/articles/1303/13/news1 05.html on May 27, 2016, 21 pages.
Summons to attend oral proceedings pursuant to Rule 115(1) EPC for European Application No. 17805064.7 dated Apr. 21, 2020, 9 pages.
Voida S., et al., "Share and Share Alike: Exploring the User Interface Affordances of File Sharing," Proceedings of the ACM Conference on Human Factors in Computing Systems (CHI 2006), Apr. 22-27, 2006, ACM, 10 pages.
White C., "5 Unusual Ways to Use Dropbox You Might Not Have Thought of," Dec. 18, 2010, retrieved from http://mashable.com/2010/12/18/dropbox-uses/ on Sep. 15, 2017, 3 pages.
Wikihow, "How to Use Facebook," 2013, retrieved from http://wmv.wikihow.com/Use-Facebook on Sep. 15, 2017, 8 pages.
Wikihow, "How to Use Facebook(with cheat sheet)", 2013, retrieved from http://www.wikihow.com/Use-Facebook on Mar. 28, 2019, 7 pages.
Non-Final Office Action from U.S. Appl. No. 16/858,120, dated Oct. 6, 2020, 8 pages.
Examination Report No. 3, for Australian Application No. 2017385025, dated Aug. 4, 2020, 5 pages.
Non-Final Office Action from U.S. Appl. No. 16/525,811, dated Aug. 20, 2020, 7 pages.
Notice of Allowance from U.S. Appl. No. 15/476,715, dated Aug. 6, 2020, 9 pages.
Notice of Allowance from U.S. Appl. No. 15/476,742, dated Aug. 21, 2020, 9 pages.

(56) References Cited

OTHER PUBLICATIONS

Notice of Reasons for Refusal for Japanese Application No. 2018-190286 dated Jun. 29, 2020, 8 pages.
Yoshida H., "Word 2007 & Excel 2007 Masterbook," Japan, Daily Communication, May 30, 2009, first edition, 3 pages.
Communication under Rule 71 (3) EPC of Intention to Grant for European Application No. 16720200.1 dated Sep. 4, 2020, 70 pages.
Co-pending U.S. patent application No. US202016911926, filed on Jun. 25, 2020.
Notice of Allowance from U.S. Appl. No. 15/476,755, dated Mar. 9, 2020, 9 pages.
Board Opinion for Chinese Application No. 201680013779.8 dated Aug. 19, 2020, 10 pages.
Examination Report No. 1, for Australian Application No. 2018397276, dated Sep. 9, 2020, 4 pages.
Final Office Action from U.S. Appl. No. 15/055,566, dated Sep. 29, 2020, 27 pages.
Notice of Allowance from U.S. Appl. No. 14/725,942, dated Sep. 16, 2020, 5 pages.
Notice of Allowance from U.S. Appl. No. 14/725,958, dated Sep. 17, 2020, 12 pages.
Notification of Reason(s) for Refusal for Japanese Application No. 2019-508895 dated Aug. 21, 2020, 7 pages.
Technology for Teachers and Students, "Microsoft OneDrive and SkyDrive Tutorial," retrieved from https://www.youtube.com/watch?v=RZoYvmi9L9E, Feb. 2, 2014, 1 page.
Communication pursuant to Article 94(3) EPC for EP Application No. 19195083.1, dated Mar. 31, 2021, 6 pages.
Communication Pursuant to Article 94(3) EPC for European Application No. 20167778.8 dated Jul. 29, 2021, 9 pages.
Decision to Refuse European Patent Application No. 17804403.8 dated Jul. 1, 2021, 12 pages.
Notice of Acceptance for Australian Application No. 2018397276 dated Jun. 28, 2021, 3 pages.
Notice of Reasons for Refusal for Japanese Application No. 2020-523702 dated Jun. 25, 2021, 12 pages.
Opposition—Decision Issued for Australian Application No. 2017385025, dated Jun. 30, 2021, 10 pages.
Advisory Action from U.S. Appl. No. 15/055,566, dated Nov. 23, 2020, 4 pages.
Anzures-Garcia M., et al., "Service-Based Layered Architectural Model for Building Collaborative Applications in Heterogeneous Environments", IEEE, 2009, 12 pages.
Bachpalle S.D., et al., "Data Security Approach for Online Social Network", IEEE, Jul. 8, 2014, 6 pages.
Brief Communication of Oral Proceedings for European application No. 17804403.8, dated May 11, 2021, 10 pages.
Communication Pursuant to Article 94(3) for EP Application No. 19182606.4 dated Mar. 16, 2021, 7 pages.
Decision to Refuse European Patent Application No. 17805064.7 dated Feb. 12, 2021, 32 pages.
Examination Report No. 2, for Australian Application No. 2018397276, dated Jan. 7, 2021, 4 pages.
Examination Report No. 3, for Australian Application No. 2017385026, dated Aug. 4, 2020, 6 pages.
Examination Report No. 4, for Australian Application No. 2017385026, dated Nov. 20, 2020, 5 pages.
Kaizu T., "Customize Explorer's New Menu on Window," Tech Tips, published on Apr. 4, 2003, 14 pages.
Kappes G., et al., "Virtualization-Aware Access Control for Multitenant Filesystems," MSST, Jun. 2-6, 2014, pp. 1-6.
Non-Final Office Action from U.S. Appl. No. 15/055,566, dated Mar. 31, 2021, 32 pages.
Notice of Allowance from U.S. Appl. No. 14/725,942, dated Mar. 10, 2021, 6 pages.
Notice of Allowance from U.S. Appl. No. 14/725,958, dated Mar. 10, 2021, 6 pages.
Notice of Allowance from U.S. Appl. No. 15/476,742, dated Feb. 8, 2021, 10 pages.
Notice of Allowance from U.S. Appl. No. 15/476,742, dated Mar. 3, 2021, 3 pages.
Notice of Allowance from U.S. Appl. No. 15/476,755, dated Feb. 10, 2021, 9 pages.
Notice of Allowance from U.S. Appl. No. 15/476,755, dated Mar. 8, 2021, 3 pages.
Notice of Allowance from U.S. Appl. No. 16/525,811, dated Feb. 26, 2021, 10 pages.
Notice of Allowance from U.S. Appl. No. 16/858,120, dated Jan. 22, 2021, 10 pages.
Notice of Reasons for Refusal for Japanese Application No. 2018-190286 dated Feb. 26, 2021, 7 pages.
Notice of Reasons for Refusal for Japanese Application No. 2019-508896 dated Jan. 5, 2021, 21 pages.

* cited by examiner

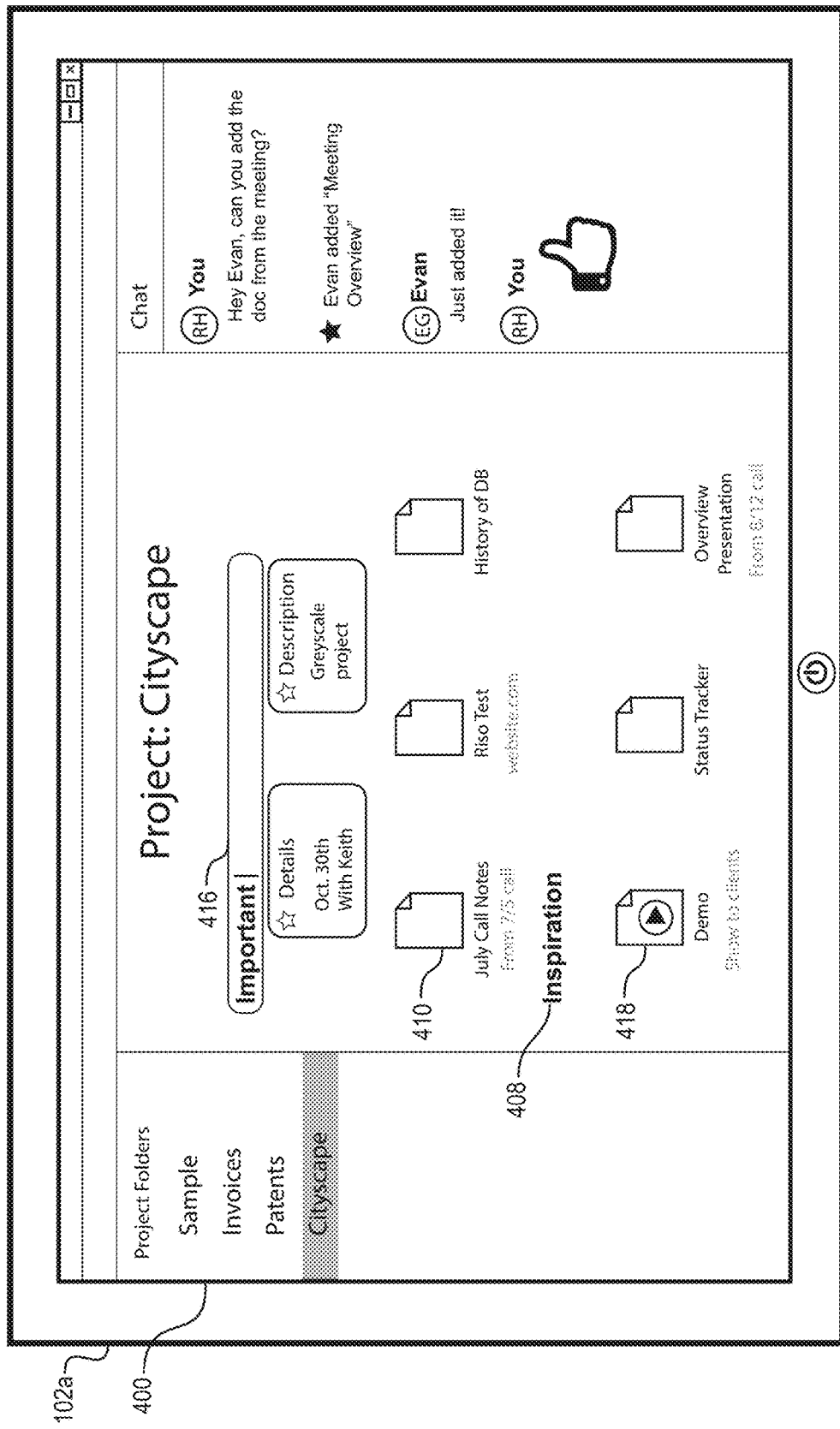

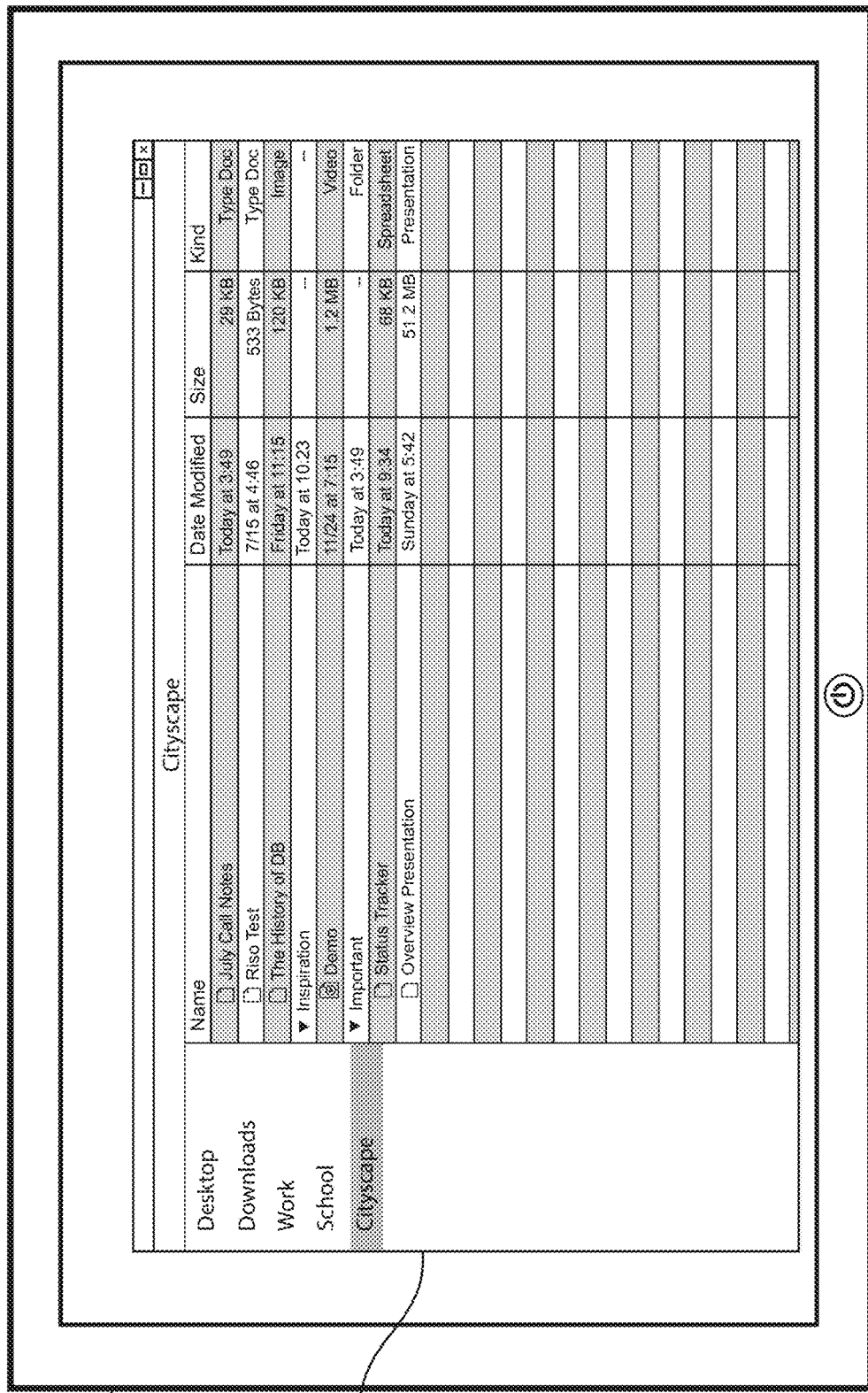

SYNCHRONIZING CHANGES WITHIN A COLLABORATIVE CONTENT MANAGEMENT SYSTEM

BACKGROUND

Advancements in computing devices and networking technology have led to a variety of innovations in providing collaborative environments for users to manage digital content as a group. For example, online digital content management systems are now able to synchronize changes to digital content across devices instantaneously so that users all over the world can work together within a single environment. Indeed, whether in education, employment, or elsewhere, modern online digital content management systems are able to provide simultaneous access to digital content for users to collaborate together, even thousands of miles apart.

Despite these advances however, conventional digital content management systems continue to suffer from a number of disadvantages. For instance, while conventional digital content management systems can synchronize files within a collaborative environment, these systems often lack context within the collaborative environment to make collaboration between users more effective. To illustrate, some conventional digital content management systems provide access for a group of users to work together within a particular folder location. However, folder locations within conventional file management systems may contain many subfolders resulting in a maze of nested files which, within these conventional systems, can be confusing and difficult to navigate with little information beyond the actual files contained within the folders themselves.

As another disadvantage, conventional digital content management systems often lack the capability to synchronize any information beyond files within a file management system. More specifically, conventional digital content management systems can synchronize files associated with native applications such as text documents, images, spreadsheets, etc., but these systems fail to provide a collaborative environment for other sources of information such as websites, cloud documents, or other sources that may not be associated with a particular native application.

Furthermore, many conventional digital content management systems inhibit coordination and feedback between users. To illustrate, while these conventional systems provide a common location for users to access files synchronized across devices, these systems often prevent users from accessing, for example, an update history for a certain file within the system to track which users made what changes to the file. Additionally, these systems also often require users to communicate with each other by way of external, un-related applications, thereby further complicating the collaborative process of working together on a single project. Thus, coordination and feedback between users of a conventional digital content management system is often scattered and inefficient.

Thus, there are several disadvantages with regard to conventional digital content management systems.

SUMMARY

One or more embodiments described herein provide benefits and solve one or more of the foregoing or other problems in the art by providing systems, methods, and non-transitory computer readable media that provide a collaborative content management interface which presents a view of nested subfolders as headers within a single interface. While this summary refers to systems for simplicity, the summary also applies to certain disclosed methods and non-transitory computer readable media. To solve the foregoing and other problems, the disclosed systems provide a collaborative content management interface for a group of users to manage a folder of files maintained by a file management system. The collaborative content management interface includes a graphical element to represent each respective file within the folder.

In addition, the disclosed systems detect user input to add a header within the collaborative content management interface. The header is a portion of text within the collaborative content management interface that partitions the collaborative content management interface and that represents a subfolder within the file management system. Based on the user input to add the header, the disclosed systems cause the file management system to create a subfolder that corresponds to the new header. For example, in one or more embodiments, the disclosed systems detect user input to add a header at a particular location within the collaborative content management interface, where some graphical elements are below the header within the collaborative content management interface. Based on that location (and, in some cases, additional user input), the systems cause the file management system to create a corresponding subfolder and move into the new subfolder any files that correspond with graphical elements located below the header within the collaborative content management interface.

The disclosed systems, methods, and non-transitory computer-readable media therefore enjoy several advantages over conventional digital image analysis systems. For example, systems described herein provide contextual information to a group of users to make collaboration on a project more efficient. To illustrate, the disclosed systems can present a single-window view of graphical elements that represent files within multiple nested subfolders of a file management system. Thus, by simplifying the complicated nature of navigating through nested folders to find desired files, the disclosed systems enable users to more easily navigate between files and can more easily see relationships between files, in addition to other contextual information.

Furthermore, the disclosed systems provide a collaborative content management interface that includes an activity monitor portion that displays a feed of user activity that takes place within the collaborative content management interface. The activity monitor portion further enables users to communicate by sending messages, files, and other information back and forth within the collaborative content management interface. Thus, the disclosed systems provide more effective and efficient coordination and feedback between a group of collaborating users.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 4A-4B, 5A-5B, 6A-6B, 7A-7B, 8A-8B, and 9A-9B illustrate example user interfaces for the collaborative content management system and the file management system in accordance with one or more embodiments;

DETAILED DESCRIPTION

Figure 1:
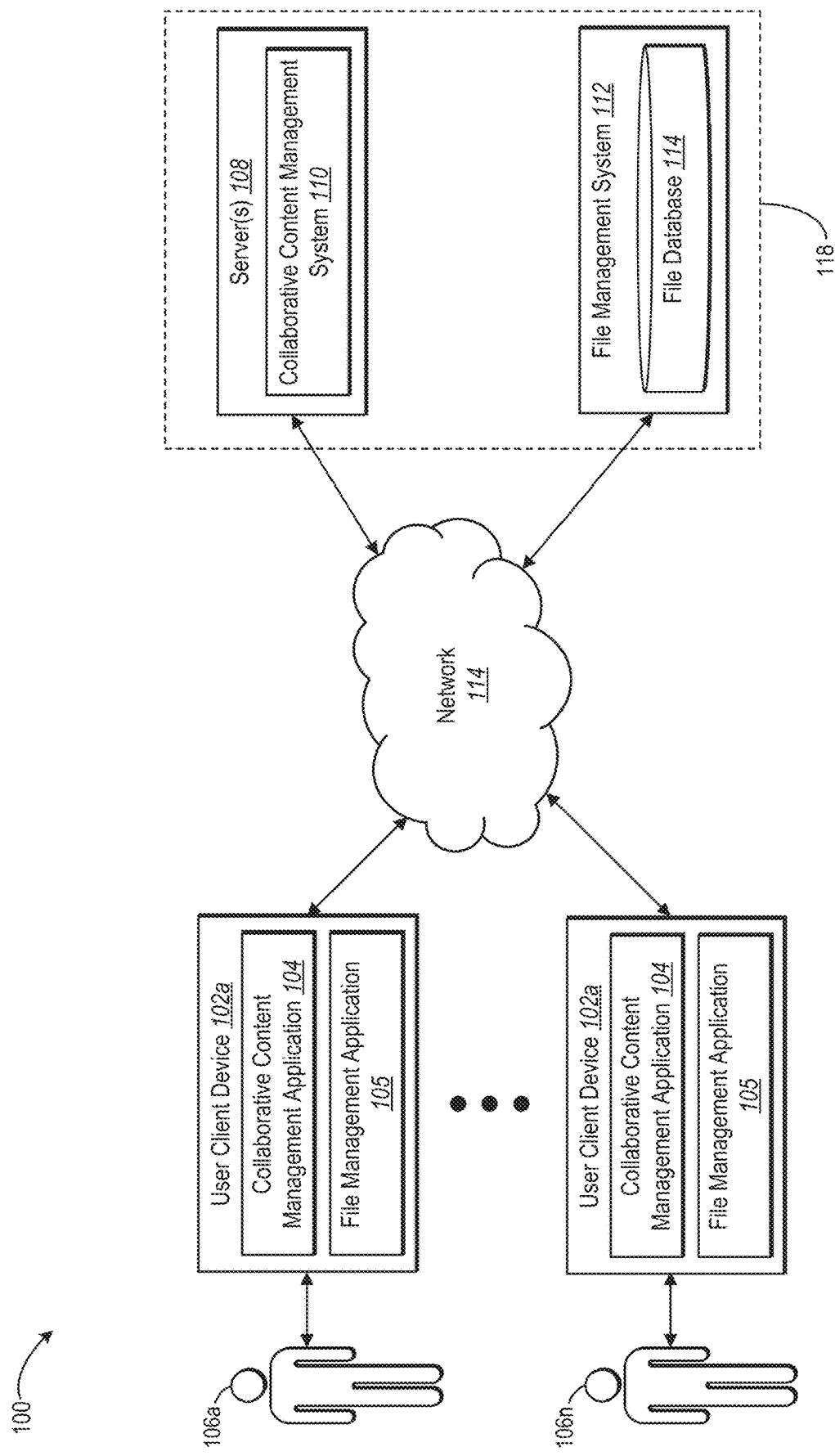
FIG. 1 illustrates a schematic diagram of an example environment of a collaborative content management system in accordance with one or more embodiments.

One or more embodiments described herein provide benefits and solve one or more of the foregoing or other problems in the art with a collaborative content management system that provides a collaborative content management interface to present a view of nested subfolders as headers within a single user interface. In particular, in one or more embodiments, the collaborative content management system provides a collaborative content management interface for display by way of a user client device. The collaborative content management interface is an interface for a group of users to manage a folder of files maintained by a file management system. In addition, the collaborative content management interface includes a graphical element to represent each respective file within the folder.

The collaborative content management system detects a user input to add a header within the collaborative content management interface. In response the to the user input, the collaborative content management system creates a new header within the collaborative content management interface and further causes the file management system to create a subfolder that corresponds with the created header.

Generally, the collaborative content management system interfaces with a file management system. More specifically, the collaborative content management system creates a metadata layer "over" a file management system to change the appearance of the file management system, add new information not available within the file management system, add new functionality not inherent to the file management system, and retain other functionality already within the file management system.

As mentioned, the collaborative content management interface includes some information, functionality, or data that is not part of the file management system or that the file management system does not itself present or provide to a user. For example, the collaborative content management system generates a metadata layer in the form of a collaborative content management interface that includes, in addition to file information from the file management system, additional contextual information displayed within a content management portion as well as within an activity monitor portion of the collaborative content management interface.

To illustrate, the content management portion of the collaborative content management interface includes graphical elements that correspond to (e.g., represent or depict) files within a folder maintained by a file management system. The content management portion can include other elements as well, such as headers that correspond to subfolders within the folder of the file management system. Other elements can include, but are not necessarily limited to, an element for a link to a website, a cloud document, a pad of "sticky" notes, a to-do list, or others.

The content management portion can further include contextual information pertaining to each graphical element presented within the content management portion. For instance, the collaborative content management system enables users to edit the graphical elements within the content management portion to include colored name labels as well as user-customized file details within the name label, and further enables users to change the size of the graphical elements, and more. As will be described in further detail below, some of the changes that take place within the collaborative content management interface translate into corresponding changes within the file management system, while other changes within the collaborative content management interface do not affect the file management system.

As mentioned, the collaborative content management interface also includes an activity monitor portion. Within the activity monitor portion of the collaborative content management interface, the collaborative content management system tracks user activity that takes place within the collaborative content management interface and provides a live feed or ticker to inform each user of the user activity. In addition, the collaborative content management system further enables users to communicate by way of the activity monitor portion of the collaborative content management interface by composing messages directed to the group of users or a subset of that group. The collaborative content management system provides the messages for display as they occur within the timeline of the user activity monitor. Additional detail regarding the collaborative content management interface, including the content management portion and the activity monitor portion, is provided below with reference to the figures.

As also mentioned, the collaborative content management system generates a collaborative content management interface for a group of users to manage a folder of files maintained by a file management system. To elaborate, the collaborative content management system detects a user input to initiate a collaborative content management interface for a given folder within the file management system. The collaborative content management system analyzes the folder to identify any subfolders and files therein and generates a collaborative content management interface that includes a presentation of the files contained within the folder. In particular, the collaborative content management interface includes a number of headers to match the number of subfolders within the folder, where each header corresponds to a different subfolder. Underneath each header within the collaborative content management interface, the collaborative content management system provides a graphical element for each file contained within the subfolder that corresponds to the given header.

In addition, the collaborative content management system can react or respond to changes to graphical elements, files, headers, and/or subfolders in a variety of ways. In some embodiments, the collaborative content management system detects a user input within the collaborative content management interface to move a graphical element from under a first header to under a second header. In response to this input, the collaborative content management system causes the file management system to move the file that corresponds with the moved graphical element from the subfolder that corresponds with the first header to the subfolder that corresponds with the second header.

Similarly, the collaborative content management system detects a user input to move a header from a first location within the collaborative content management interface to a second location within the collaborative content management interface. In response to this user input, the collaborative content management system causes the file management system to move files within the file management system accordingly. More specifically, depending on new location of the header within the collaborative content management interface, the collaborative content management system causes the file management system to move files within the file management system to match the graphical elements depicted within the collaborative content management interface. For instance, for any graphical elements that are under the header at the new location, the collaborative content management system causes the file management system to move the corresponding files into the subfolder that corresponds to the header. Likewise, for any graphical elements that were under the header at the first location but are no longer under the header at the second location, the collaborative content management system causes the file management system to remove the corresponding files from the subfolder that corresponds to the header, and to relocate the files to any subfolder that corresponds with the header under which the graphical elements now reside, or else to the folder maintained by file management system if no such header exists.

In addition, the collaborative content management system detects user input to delete a header. In response to the user input to delete the header, the collaborative content management system deletes the header from the collaborative content management interface and causes the file management system to move the files that correspond with the graphical elements that were under the header before it was deleted. In particular, the collaborative content management system causes the file management system to move the files to any subfolder that corresponds with a different header under which the graphical elements now reside within the collaborative content management interface, or else to the folder that contains each respective subfolder if no such header exists.

Thus, in response to detecting changes within the collaborative content management interface, the collaborative content management system causes the file management system to make changes within the file management system in kind. Conversely, in the same or other embodiments, the collaborative content management system also responds in kind to detected changes within the file management system.

For example, in these embodiments, the collaborative content management system receives an indication of user input from the file management system. To illustrate, in some embodiments the collaborative content management system receives an indication from the file management system that a user has moved a file from a first subfolder to a second subfolder. In response to the indication, the collaborative content management system moves the graphical element that corresponds with the relocated file from under a header within the collaborative content management interface that corresponds with the first subfolder to under a header that corresponds with the second subfolder.

Additionally, the collaborative content management system can receive an indication from the file management system that a user has deleted a file from the file management system. In response to receiving this indication, the collaborative content management system deletes or removes the graphical element that corresponds with the deleted file from the collaborative content management interface.

Similarly, the collaborative content management system can receive an indication from the file management system that a user has deleted a subfolder from within the folder displayed within the collaborative content management interface. In response to receiving the indication that the user has deleted the subfolder, the collaborative content management system deletes or removes the header that corresponds to the deleted subfolder from the collaborative content management interface, and further deletes any graphical elements that correspond with files that were contained within the deleted subfolder from the collaborative content management interface.

By providing a user-friendly collaborative workspace for a group of users to manage files within a folder maintained by a file management system in this way, the collaborative content management system provides several advantages over conventional digital content management systems. For example, the collaborative content management system provides a collaborative content management interface that enables users to easily navigate through files nested in multiple different subfolders. Indeed, the collaborative content management interface can include a single-window view of the contents of several subfolders whereby a user can easily access and edit digital content. Therefore, the collaborative content management system is faster and more efficient than conventional digital content management systems because the collaborative content management system processes fewer user interactions to access the same digital content.

As another advantage over conventional content management systems, the collaborative content management system provides an activity monitor portion within the collaborative content management interface to improve user coordination and feedback. To illustrate, if a user wants to discuss a particular file or part of a file using conventional content management systems, these systems require the user to access third-party applications or to otherwise navigate away from the file in question to open some other communication application. The collaborative content management system, on the other hand, provides an activity monitor portion within the collaborative content management interface that enables a user to discuss a file while simultaneously viewing the content management portion whereby the user can manipulate the file.

Additionally, as briefly mentioned above, because the collaborative content management system provides an activity monitor portion, the collaborative content management system further provides more useful contextual information to users than conventional systems. In particular, the collaborative content management system provides a timeline of user activity that transpires within the collaborative content management interface so that users can see an event history of which users have made what changes to the files within the folder of the collaborative workspace.

Additional detail regarding the collaborative content management system is provided below. Throughout the description of the collaborative content management system, various terminology will be used to describe the systems, methods, and computer readable media associated with the collaborative content management system. Accordingly, hereafter is provided a number of definitions of terms that relate to the collaborative content management system and the disclosure provided herein.

As used herein, the term "user" refers to an individual, group of individuals, company, or other entity who operates a user client device. In particular, a user may refer to an individual who operates the user client device to access a folder of files maintained by a file management system, to move files from one location to another within the folder, and/or to otherwise manipulate the files within the folder.

As used herein, the term "user client device" refers to a computing device associated with user. In particular, a user client device can refer to a computing device capable of communicating with a network, processing user input, and displaying a user interface to a user. A user client device can include a display screen capable of displaying or presenting a user interface such as the collaborative content management interface. For instance, a user client device can include a mobile device such as a smartphone, a tablet, or a wearable device, or else can include a computing device such as a desktop or laptop computer. A user client device can be associated with a user who operates the user client device to access, edit, or otherwise manipulate files within a file management system.

As mentioned, a user operates a user client device to access files maintained by a file management system. As used herein, the term "file management system" refers to a computer system that manages a hierarchy of digital data. More particularly, a file management system can refer to a computer system that organizes and maintains files of digital content at different locations within computer memory or storage. A file management system can be local on a single computing device or can be cloud-based, located externally from a computing device that accesses data maintained by the file management system. Examples of file management systems include, but are not limited to DROPBOX, GOOGLE DRIVE, and MICROSOFT ONEDRIVE.

A user accesses files maintained by a file management system by navigating through the file management system using a file management application. As used herein, the term "file management application" refers to an application that enables a user to navigate through a folders and/or files maintained by a file management system. In particular, a file management application can refer to an application capable of performing actions based on user input to open or otherwise navigate through folders and/or files within a file database of a file management system. Examples of file management applications include, but are not limited to MICROSOFT WINDOWS EXPLORER and APPLE MACOS FINDER.

As used herein, the term "file" refers to a digital content item within a file management system. A file can include a file of a particular type such as an image file, a text file, a spreadsheet, an audio file, a video file, or some other type of file. Indeed, a file can include any of a large number of possible file types accessible by a computing device.

As used herein, the term "folder" refers to a representation of a location within digital computer memory. In particular, a folder refers to a representation of a location of computer memory within a hierarchy of computer memory locations. Indeed, a file management system can maintain a number of folders organized together within the file management system, where some folders are nested (e.g., located or contained) within other folders. A folder that is nested within another folder can be referred to as a "subfolder." Accordingly, the collaborative content management system generates a collaborative content management interface that represents a folder maintained by the file management system, wherein any headers displayed within the collaborative content management interface represent corresponding subfolders within the folder of the file management system.

As mentioned, the collaborative content management system interfaces with a file management system to generate a collaborative content management interface that presents graphical elements that represent files within a folder maintained by the file management system. As used herein, the term "graphical element" refers to a graphical representation or portrayal of a file. More specifically, a graphical element can refer to an element that is moveable or otherwise manipulable by a user via the collaborative content management interface. In particular, a single graphical element corresponds with a given file within a folder of the file management system, and various actions that the collaborative content management system receives or detects in relation to the graphical element can result in corresponding actions within the file management system, and vice-versa. Within the collaborative content management interface, a graphical element can have the same appearance as an icon for a file within the file management system or can have a different appearance within the collaborative content management interface.

As mentioned, the collaborative content management system receives user input to add a header within the collaborative content management interface. As used herein, the term "header" refers to a link or block of text that indicates a partition (e.g., a new section) within a user interface. In addition, a header can be a visual representation within a user interface (e.g., the collaborative content management interface) of a subfolder maintained by a file management system.

More detail regarding the collaborative content management system will now be provided with reference to the figures. For example, FIG. 1 illustrates a schematic diagram of example environment 100 for implementing collaborative content management system 110 in accordance with one or more embodiments. An overview of collaborative content management system 110 is described in relation to FIG. 1. Thereafter, a more detailed description of the components and processes of collaborative content management system 110 is provided in relation to the subsequent figures.

As shown in FIG. 1, environment 100 includes (i.e., may be implemented by) server(s) 108, file management system 112, user client devices 102a-102n (referred to herein collectively as "user client devices 102") associated with users 106a-106n (referred to herein collectively as "users 106"), and network 116. Each of the components of environment 100 can communicate via network 116, and network 116 may be any suitable network over which computing devices can communicate. Example networks are discussed in more detail below in relation to FIG. 13.

As illustrated in FIG. 1, server(s) 108 include collaborative content management system 110. For example, collaborative content management system 110 may be implemented by (e.g., installed on) server(s) 108 as hardware, software, or both. Additionally, server(s) 108 may refer to one or more computing devices capable maintaining a common file storage (e.g., a "cloud" storage) and of further capable of running a synchronizing ("sync") engine to synchronize file changes across multiple user devices (e.g., user client devices 102).

To elaborate, server(s) 108 may generate, store, receive, and transmit any type of electronic data, such as digital files, user activity information, electronic messages, etc. For example, server(s) 108 may transmit data to a user client device to provide digital content, as mentioned above. Furthermore, server(s) 108 can communicate with a user client device via network 116 to receive user activity information. Server(s) 108 can also receive and provide electronic messages associated with one or more of user client devices 102. In some embodiments, server(s) 108 comprises a content server. Server(s) 108 can also comprise a communication server or a web-hosting server.

Although FIG. 1 depicts collaborative content management system 110 located on server(s) 108, in some embodiments, collaborative content management system 110 may be implemented by (e.g., located entirely or in part) on one or more other components of environment 100. For example, collaborative content management system 110 may be implemented by user client devices 102 and/or network 116.

As illustrated in FIG. 1, collaborative content management system 110 may communicate with file management system 112 via network 116. Alternatively, collaborative content management system 110 may communicate with the file management system 112 directly, bypassing network 116, and using an appropriate communication protocol. To illustrate, in some embodiments, the collaborative content management system 110 may be part of a cloud-based collaborative content management system 118, as indicated by the dashed lines in FIG. 1. In these embodiments, collaborative content management system 110 and file management system 112 are part of the same cloud-based collaborative content management system 118, located either on the same device or on separate devices that interface through network 116 or, in some cases, directly, bypassing network 116. For example, in some embodiments, collaborative content management system 110 is located on the same device (e.g., server(s) 108) as file management system 112. In other embodiments, however, collaborative content management system 110 and file management system 112 are located on separate server devices.

As further illustrated in FIG. 1, collaborative content management system 110 may communicate with file management system 112 to access information pertaining to files maintained by file management system 112 within file database 114. Indeed, collaborative content management system 110 may generate a collaborative content management interface metadata layer based on information obtained from file management system 112, including a folder hierarchy and other file information within file database 114.

As outlined in greater detail below, collaborative content management system 110 can interface with file management system 112 in a variety of ways. For example, in one or more embodiments, collaborative content management system 110 generates a collaborative content management interface to represent a folder maintained by file management system 112. In these embodiments, collaborative content management system 110 receives user input to add a header within the collaborative content management interface and further causes file management system 112 to create a subfolder that corresponds to the new header.

As mentioned, collaborative content management system 110 may provide the collaborative content management interface to user client devices 102. Indeed, collaborative content management system 110 can distribute (e.g., via the network 116) digital content to users 106 by way of the collaborative content management interface. Additional detail regarding the collaborative content management interface is provided below with reference to subsequent figures.

As illustrated in FIG. 1, user client devices 102 each include collaborative content management application 104 and file management application 105. Collaborative content management application 104 may be a web application or a native application installed on a user client device (e.g., a mobile application, a desktop application, etc.). For example, collaborative content management application 104 can be implemented in whole or in part by software or hardware installed on a user client device. In addition, collaborative content management application 104 can facilitate communications between users 106 via user client devices 102, and may further facilitate communications with collaborative content management system 110 and/or file management system 112. Indeed, collaborative content management application 104 can receive data from collaborative content management system 110 and present, for display, a graphical user interface ("GUI") in the form of a collaborative content management interface to users 106.

File management application 105 may be a web application or a native application installed on a user client device (e.g., a mobile application, a desktop application, etc.). For example, file management application 105 can be implemented in whole or in part by software or hardware installed on a user client device. In addition, file management application 105 can enable a user to navigate through a file database (e.g., file database 114) maintained by a file management system (e.g., file management system 112). For instance, file management application 105 can receive user input to perform actions to open or otherwise manipulate files and/or folders within a data hierarchy of a file database. File management application 105 can further communicate (e.g., via network 116 or otherwise) with server(s) 108, file management system 112, and/or cloud-based collaborative content management system 118 to gather information related to files and/or folders within file database 114. Accordingly, file management application 105 can present a file management view to a user whereby the user can manage, manipulate, move, delete, or perform other actions relative to files and/or folders maintained by file management system 112.

In some embodiments, though not illustrated in FIG. 1, collaborative content management system 110 may have a different arrangement of components and/or may have a different number or set of components altogether than that illustrated in environment 100. For example, some user client devices 102 may communicate directly, bypassing network 116. Additionally, file management system 112 may be housed within server(s) 108 along with collaborative content management system 110. Further, collaborative content management system 110 can be implemented in a variety of different ways across server(s) 108, network 116, and user client devices 102.

Although not illustrated in FIG. 1, file management system 112 may be located on each of user client devices 102, along within collaborative content management application 104. Thus, a user (e.g., user 106a) may navigate through file database 114 by way of file management system 112 on user client device 102a and open collaborative content management application 104 for a particular folder within file database 114.

Figure 2A:
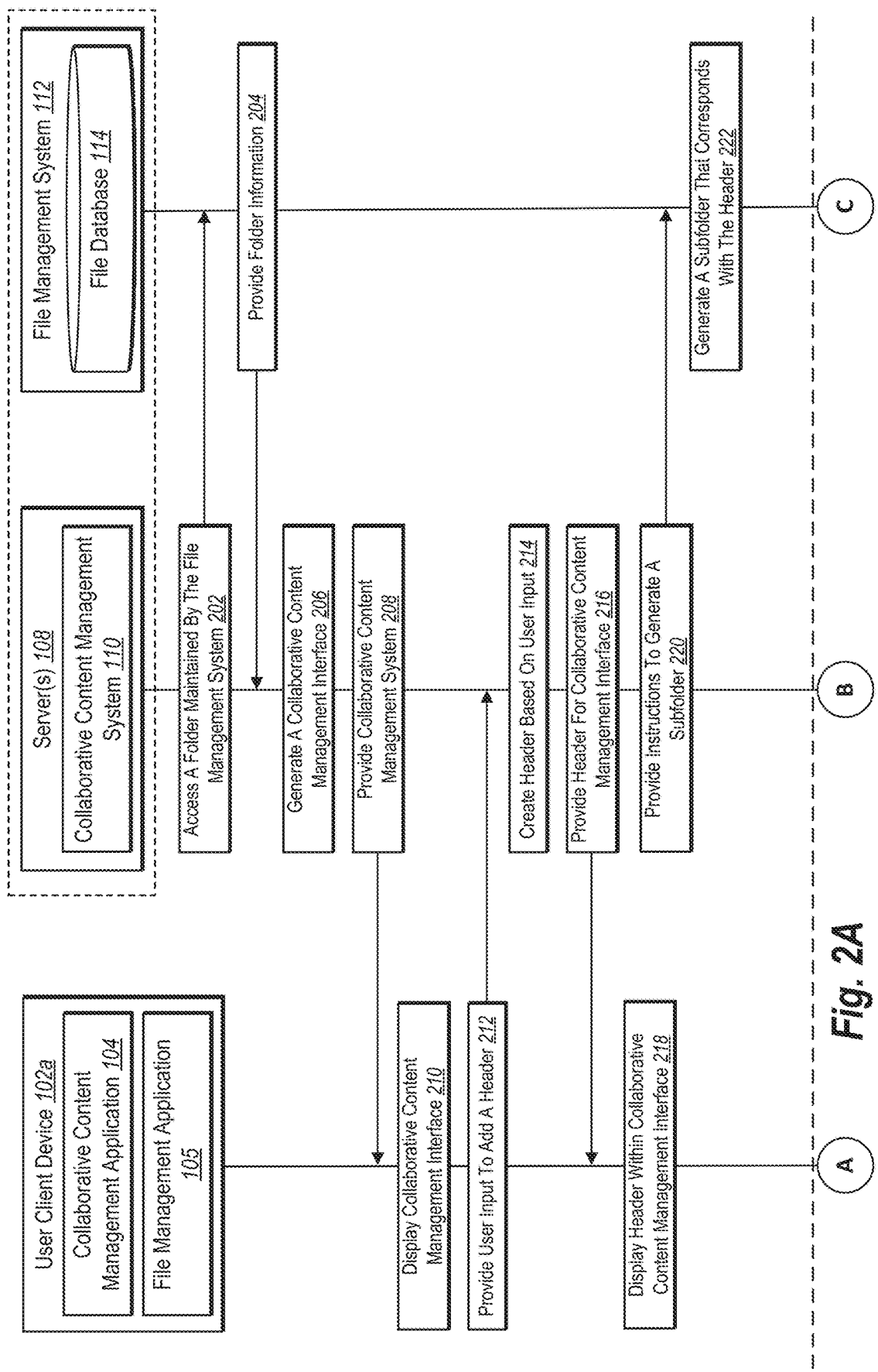
FIGS. 2A-2C illustrate a sequence flow for providing a collaborative content management interface in accordance with one or more embodiments.
Figure 2B:
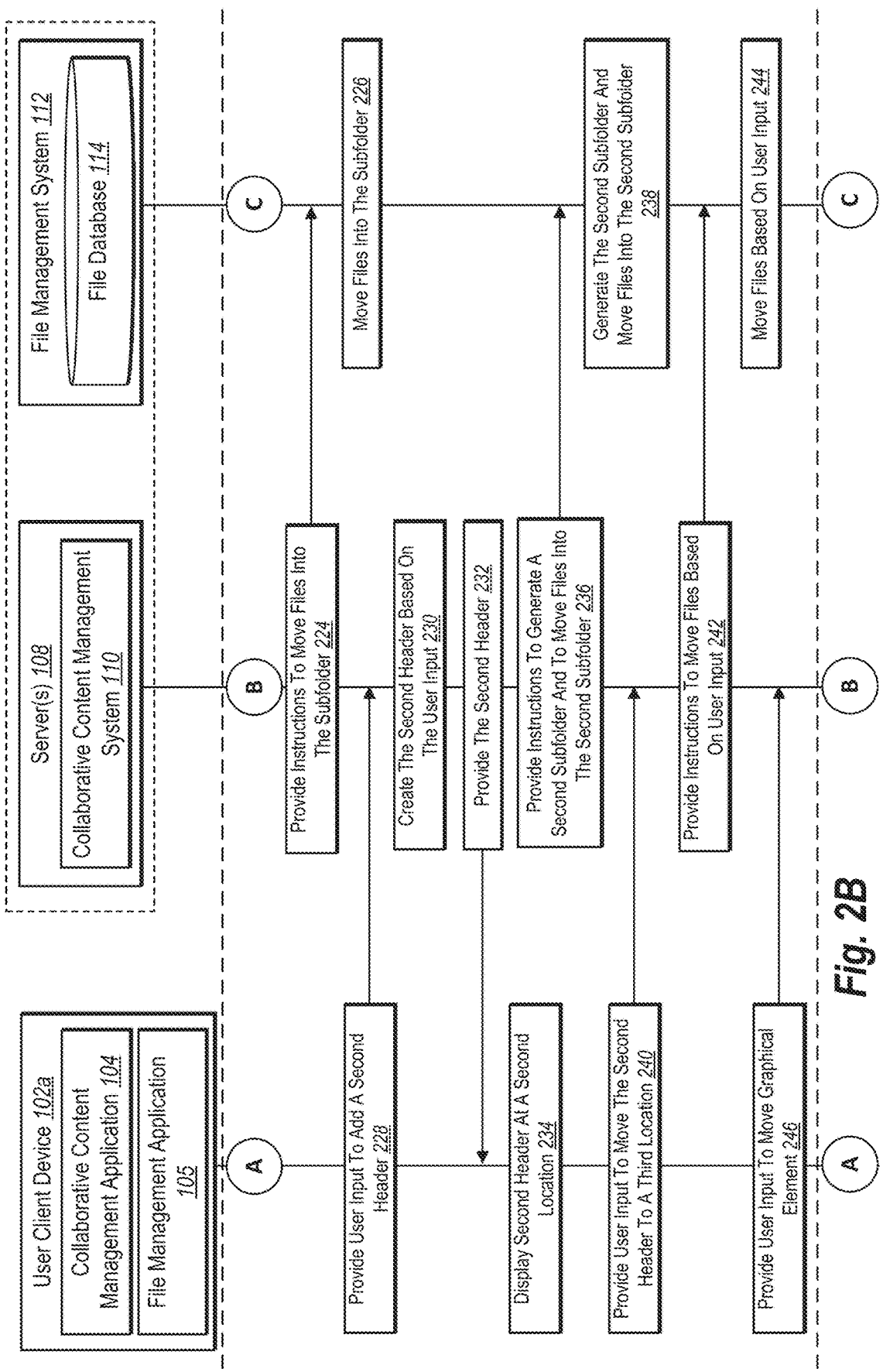
Figure 2C:
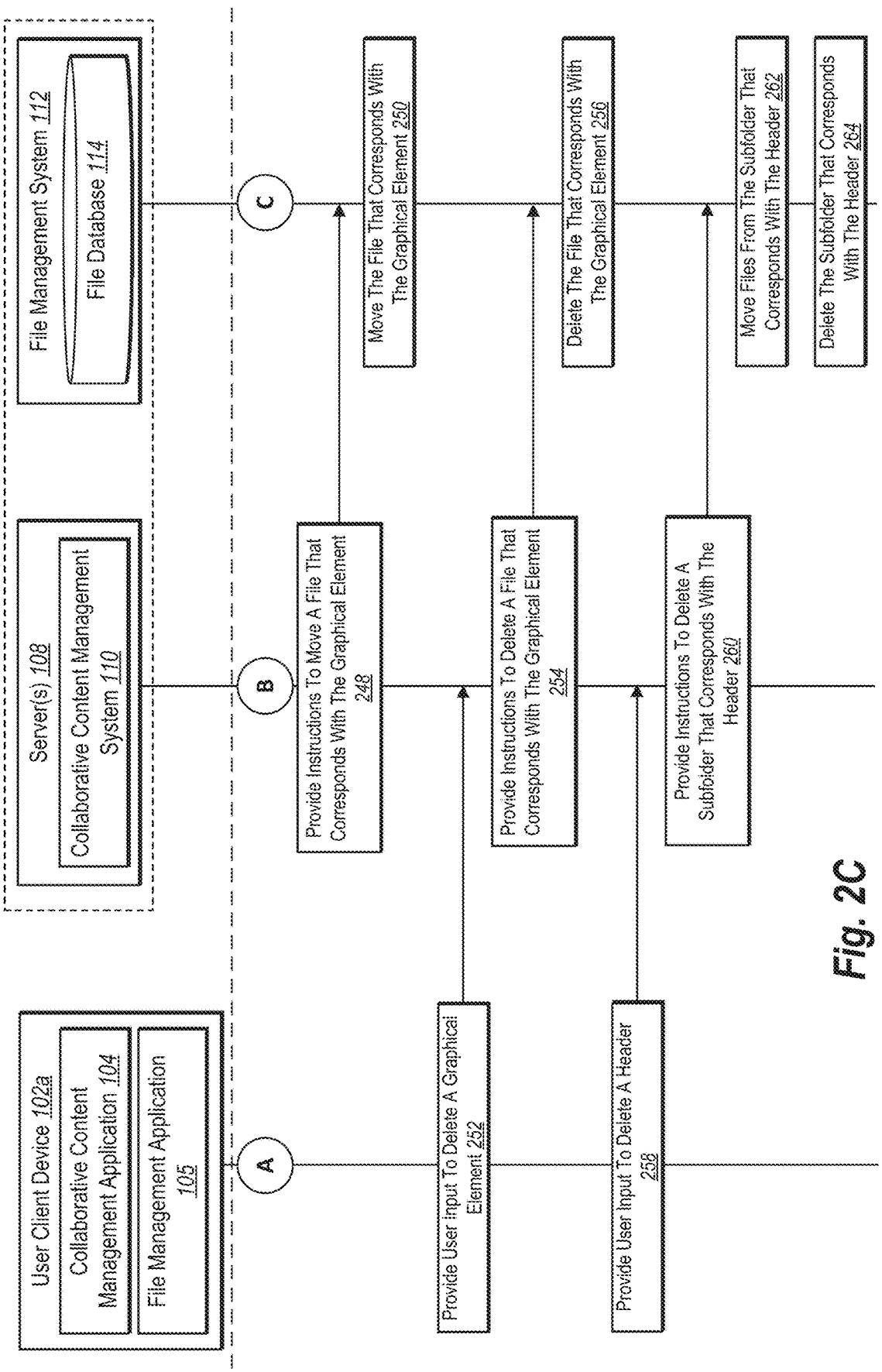

As described above, in one or more embodiments collaborative content management system 110 provides a collaborative content management interface to user client devices 102 and synchronizes changes to the collaborative content management interface and corresponding changes to file management system 112 so that each of users 106 perceives the same status of the collaborative content management interface via each respective user client device. For example, FIGS. 2A-2C illustrate an exemplary sequence flow of actions performed by various components (e.g., user client device 102a, collaborative content management system 110, and file management system 112) of environment 100 pertaining to collaborative content management system 110 providing the collaborative content management interface to user client device 102a. While FIGS. 2A-2C illustrate a single user client device 102a, this is only illustrative, and collaborative content management system 110 can perform identical or similar actions in relation to others of user client devices 102.

Additionally, while FIGS. 2A-2C illustrate a particular sequence of acts performed by specific components of environment 100, additional or alternative sequences are possible. Indeed, some of the acts described below can be performed by other components of environment 100. Similarly, some of the acts within the sequence flow can be performed in a different order, before or after other acts as described hereafter.

As shown, collaborative content management system 110 performs act 202 to access a folder maintained by file management system 112. In particular, collaborative content management system 110 receives a user input by way of user client device 102a that indicates that user 106a navigates through file management application 105 to request access to a folder maintained by file management system 112. Accordingly, collaborative content management system 110 communicates with file management system 112 to access the requested folder within file database 114.

In response to receiving the request to access the folder, file management system 112 performs act 204 to provide folder information for the requested folder. In particular, file management system 112 provides information pertaining to files contained within the folder as well as subfolders contained within the folder. For example, file management system 112 provides information to inform the collaborative content management system 110 as to what files are contained within the folder, including file type, size, name, and other information that file management system 112 maintains. In addition, file management system 112 provides information to collaborative content management system 110 as to a number, size, and name of subfolders contained within the folder as well.

Based on receiving the folder information, collaborative content management system 110 performs act 206 to generate a collaborative content management interface. In particular, collaborative content management system 110 generates a collaborative content management interface to reflect the information provided by file management system 112. To elaborate, collaborative content management system 110 generates a collaborative content management interface that is a graphical user interface that includes representations of files and subfolders contained within the folder on file database 114.

More specifically, the collaborative content management interface can include and present a graphical element for each file contained within the folder. In particular, the collaborative content management interface can present a graphical element for a text file with a certain appearance, while the collaborative content management interface can present files of other types with other appearances. In addition, each graphical element within the collaborative content management interface has a name associated thereto. Collaborative content management system 110 matches the name of each graphical element with the name of the corresponding file maintained by file management system 112.

In addition, the collaborative content management interface can present a header for each respective subfolder contained within the folder. In particular, collaborative content management system 110 analyzes the information received from file management system 112 to determine a number of subfolders within the accessed folder. Based on the analysis, collaborative content management system 110 creates a header for each subfolder, and names each header to match the name of the corresponding subfolder within file database 114. Additional detail regarding the appearance and layout of the graphical elements and headers within the collaborative content management interface is provided below in relation to subsequent figures.

The graphical elements and headers within the collaborative content management interface are moveable and otherwise manipulable. To illustrate, collaborative content management system 110 enables a user (e.g., user 106a) to move the location of a graphical element or a header by providing user input (e.g., touch-and-drag or click-and-drag input). In addition, collaborative content management system 110 can further receive an indication of user input to change the size of a graphical element or a header within the collaborative content management interface.

Upon generating the collaborative content management interface (act 206), collaborative content management system 110 further performs act 208 to provide the collaborative content management interface to user client device 102a. As mentioned above, collaborative content management system 110 communicates with user device 102a either directly or via network 116. By communicating with user client device 102a, collaborative content management system 110 transmits data to provide the collaborative content management interface for display by way of user client device 102a.

In response to receiving the collaborative content management interface from collaborative content management system 110, user client device 102a performs act 210 to display the collaborative content management interface. In particular, user client device 102a displays the collaborative content management interface within a display screen of user client device 102a. For example, user client device 102a performs act 210 by way of collaborative content management application 104 on user client device 102a. Indeed, presenting the collaborative content management interface can be one aspect of implementing collaborative content management application 104.

As shown in FIG. 2A, user client device 102a further performs act 212 to provide user input to add a header to the collaborative content management interface. In particular, user client device 102a detects user input by way of a touchscreen, mouse, keyboard, or other user input device or interface. In some embodiments, user client device 102a detects a selection of an "insert" option whereby user 106a can insert a new header into the collaborative content management interface. In the same or other embodiments, user client device 102a detects a touch-and-drag or click-and-drag input to place a header at a particular location within the collaborative content management interface.

Irrespective of the type of user input, user client device 102a provides an indication of the user input to collaborative content management system 110 (e.g., via network 116). Based on the user input, collaborative content management system 110 performs act 214 to create a header. In particular, collaborative content management system 110 creates a header at a particular location within the collaborative content management interface indicated by the user input. Collaborative content management system 110 creates a new header by generating a new line or block of text and partitioning (e.g., segmenting, delineating, or dividing) the collaborative content management interface within that line or block of text, where those graphical elements that appear below (at least up to a subsequent header, if one exists) the line or block of text are associated with the new header, and those graphical elements that appear above are not.

In addition, collaborative content management system 110 performs act 216 to provide the header to user client device 102*a*. To illustrate, collaborative content management system 110 communicates with user client device 102*a* to provide an indication of where to place a new header as well as what text to use for the new header within the collaborative content management interface.

Upon receiving the transmission of the new header from collaborative content management system 110, user client device 102*a* performs act 218 to display the header within the collaborative content management interface. In particular, user client device 102*a* presents the header at the location indicated by the user input. Additional detail regarding the appearance of the header within the collaborative content management interface is provided below with reference to subsequent figures.

As further illustrated in FIG. 2A, based on receiving an indication of user input to create a new header within the collaborative content management interface (act 212), collaborative content management system 110 performs act 220 to cause file management system to generate a subfolder. In particular, collaborative content management system 110 provides instructions to generate a subfolder within the folder on file database 114. More specifically, collaborative content management system 110 provides instructions to generate a new subfolder with a name that matches the name of the header.

Based on receiving the instructions to generate the subfolder, file management system 112 performs act 222 to generate the subfolder within file database 114. As mentioned, file management system 112 generates the subfolder in a location within the folder represented by the collaborative content management interface. In addition, file management system 112 names the new subfolder to match the name of the added header. Furthermore, based on generating the subfolder that corresponds with the new header, user client device 102*a* can present a view of the new subfolder to user 106*a* by way of file management application 105.

Continuing the sequence flow from FIG. 2A to FIG. 2B, collaborative content management system 110 performs act 224 to cause file management system to move files into the new subfolder. In particular, collaborative content management system 110 provides instructions to move any files that correspond with graphical elements that appear below the header within the collaborative content management interface into the subfolder. More specifically, collaborative content management system 110 provides instructions to move files that correspond to graphical elements that are displayed below the header and above any other header that appears at a location below the header. Indeed, each header within the collaborative content management interface represents a different subfolder within file database 114, and each graphical element that appears under a given header within the collaborative content management interface corresponds with files that are contained within the respective subfolder within file database 114.

In response to receiving the instructions to move the files, file management system 112 performs act 226 to move files into the new subfolder. To elaborate, file management system 112 moves the files that correspond with graphical elements that appear below the new header within the collaborative content management interface (and above any subsequent header). File management system 112 may move the files by relocating them so that the files are no longer contained at the previous location within file database 114 and are stored only within the newly-created subfolder. Alternatively, file management system 112 may move the files by copying them so that the files are located both in the previous location within file database 114 as well as within the new subfolder. In addition, user client device 102*a* can present these changes within file management system 112 to user 106*a* by way of file management application 105 so that user 106*a* sees an updated view of the files and/or folders within file database 114, reflecting the movement of files from one location to another.

As shown in FIG. 2B, user client deice 102*a* performs act 228 to provide user input to add a second header within the collaborative content management interface. In particular, as described above, user client device 102*a* receives user input in the form of touch input, mouse input, keyboard input, voice input, etc. In response to the user input, user client device 102 provides the user input to collaborative content management system 110.

Based on receiving the user input from user client device 102*a*, collaborative content management system 110 further performs act 230 to create a second header within the collaborative content management interface. As described above, collaborative content management system 110 creates the second header based on user input received at user client device 102*a* to enter text to name the header, to place the header at a particular location within the collaborative content management interface, and/or to change other header attributes such as color, text features (e.g., bold, underline, italics, etc.), font size, etc.

Upon creating the second header in act 230, collaborative content management system 110 performs act 232 to provide the second header to user client device 102*a*. As described above, collaborative content management system 110 communicates with user client device 102*a* (e.g., via network 116) to provide information to user client device 102*a* to render, rasterize, or otherwise display the header within the collaborative content management interface. Indeed, collaborative content management system 110 can provide location information, text information, and other information to cause user client device 102*a* to present the header in accordance with the user input (e.g., with correct text, at the correct location, etc.).

As mentioned, in response to receiving the second header from collaborative content management system 110, user client device 102*a* performs act 234 to display the second header at a second location. Indeed, user client device 102*a* displays the second header within the collaborative content management interface at the location indicated by the user input. In some cases, the second header is located above the first header described above. In other cases, the second header is located below the first header within the collaborative content management interface. Depending on the location of the second header within the collaborative content management interface, collaborative content management system 110 causes file management system 112 to perform appropriate actions that correspond with the location of the header.

To illustrate, as shown in FIG. 2B, collaborative content management system 110 performs act 236 to cause file management system 112 to generate a second subfolder and move files into the second subfolder. In particular, collaborative content management system 110 provides instructions to file management system 112 to generate a second subfolder within file database 114 and that corresponds with the second header within the collaborative content management interface. For example, collaborative content management system 110 provides instructions to name the second subfolder to match the name of the second header, and to place the second subfolder within the folder depicted by the collaborative content management interface.

In addition, collaborative content management system 110 provides instructions to move files into the second subfolder. For instance, collaborative content management system 110 provides instructions to move those files that correspond with graphical elements that appear below the second header within collaborative content management interface. As an example, in cases where the second header appears below the first header within the collaborative content management interface, collaborative content management system 110 provides instructions to move those files that correspond with any graphical elements that were previously below (e.g., lower on a display) the first header and that are now below the second header. Collaborative content management system 110 provides instructions to move these files from the first subfolder to the second subfolder, thereby removing them from the first subfolder and transferring them to the second subfolder.

As another example, in cases where the second header appears above (e.g., higher up on a display) the first header within the collaborative content management interface, collaborative content management system 110 provides instructions to move those files that correspond with any graphical elements that appear below the second header into the second subfolder. To illustrate, before collaborative content management system 110 creates the second header within the collaborative content management interface, some graphical elements may appear above the first header. Therefore, the files associated with these graphical elements are not contained within a subfolder, but are instead located within the same folder within file database 114 as the subfolder that corresponds with the first header. Upon creating the second header above these graphical elements within the collaborative content management interface, collaborative content management system 110 provides instructions to move those files within the folder into the second subfolder.

While FIG. 2B illustrates act 236 as a single act, in some embodiments act 236 may be split into multiple acts that the collaborative content management system 110 performs. For example, collaborative content management system 110 can provide instructions to generate a second subfolder that corresponds with the second header, whereupon file management system 112 generates the second subfolder. Upon receiving an indication that file management system 112 has created the second subfolder, collaborative content management system 110 can perform a subsequent act of causing file management system 112 to move the appropriate files into the second subfolder, as described above.

In response to receiving the instructions to generate the second subfolder and move the appropriate files, files management system 112 performs act 238 to generate the second subfolder and move the files into the second subfolder, as described above. As also described above, user client device 102a can portray the newly-generated subfolder and the new location of moved files by way of file management application 105. Additional detail regarding the appearance of file management application 105 is provided below in relation to subsequent figures.

As further illustrated in FIG. 2B, user client device 102a performs act 240 to provide user input to move the second header to a third location within the collaborative content management interface. For example, user client device 102a receives user input to drag the second header from the original location of the second header to a new location. As described above, the first header may be located in a first location, the second header may be located in a second location, and user 106a may provide input to move the second header from the second location to a third location within the collaborative content management interface.

Although not illustrate in FIG. 2B, collaborative content management system 110 may further provide instructions to user client device 102a to move the second header to the third location within the collaborative content management interface. Alternatively, user client device 102a may move the second header in response to receiving the user input, independently of receiving any such instruction from collaborative content management system 110.

In response to receiving the indication of user input to move the second header to a third location (act 240), collaborative content management system 110 performs act 242 to cause file management system 112 to move the appropriate files. In particular, collaborative content management system 110 provides instructions to move those files that correspond with graphical elements that were previously, but are no longer, located under the second header within the collaborative content management interface out of (e.g., remove from) second subfolder within file database 114. Additionally, collaborative content management system 110 provides instructions to move files that correspond with any graphical elements that were not previously, but that are now (after moving the header to the third location), located under the second header within the collaborative content management interface into the second subfolder within file database 114.

Upon receiving the instructions to move the files based on the user input to move the header within the collaborative content management interface, file management system 112 performs act 244 to move the appropriate files within file database 114. In particular, file management system 112 removes those files from the second subfolder that correspond with graphical elements that are no longer under the second header within the collaborative content management interface. Further, file management system 112 adds those files that correspond with graphical elements that are now, at the third location, under the second header within the collaborative content management interface into the second subfolder. As mentioned above, user client device 102a displays, by way of file management system 105, the new location of the moved files within file database 114.

As further illustrated in FIG. 2B, user client device 102a performs act 246 to provide user input to move a graphical element within the collaborative content management interface. For example, user client device 102a detects user input to relocate a graphical element within the collaborative content management interface from under the first header to under the second header. In other examples, user client device 102a detects user input to move a graphical element from under the second header to under the first header, or else from a location not under any headers to a location under the first header or the second header, or vice-versa. Regardless of which movement the user input indicates, user client device 102a provides an indication of the user input to collaborative content management system 110.

As mentioned above, user client device 102a moves the graphical element within the collaborative content management interface in accordance with the user input to move the graphical element. Alternatively, collaborative content management system 110 provides instructions to user client device 102a to cause user client device 102a to move the graphical element within the collaborative content management interface in accordance with the user input.

Continuing the discussion of the sequence flow from FIG. 2B to FIG. 2C, collaborative content management system 110 performs act 248 to cause file management system 112 to move the file that corresponds with the moved graphical element. In particular, collaborative content management system 110 provides instructions to move the file from a location within file database 114 that corresponds with the previous location of the respective graphical element within the collaborative content management interface, to a location within file database 114 that corresponds with the current location of the graphical element within the collaborative content management interface.

As an example, in cases where the user input indicates to move the graphical element from under a first header to under a second header, collaborative content management system 110 provides instructions to file management system 112 to move the file that corresponds with the graphical element from a first subfolder that corresponds with the first header to a second subfolder that corresponds with the second header. Similarly, in cases where the user input indicates to move the graphical element from a different location and to a subsequent location, collaborative content management system 110 provides instructions to move the corresponding file accordingly.

Indeed, as shown in FIG. 2C, file management system 112 performs act 250 to move the file that corresponds with the moved graphical element. File management system 112 using the methods and techniques as described above.

As shown in FIG. 2C, user client device 102a performs act 252 to provide user input to delete a graphical element from the collaborative content management interface. In particular, user client device 102a receives user input to drag a graphical element to a trash bin or a recycling bin. In other embodiments, user client device 102a receives user input to delete a graphical element by way of a graphical "X" that indicates an action to remove a graphical element from the collaborative content management interface. Alternatively, user client device 102a detects user input in the form of a delete button while a graphical element is selected, indicating a delete or removal operation of the graphical element.

User client device 102a may delete the graphical element from the collaborative content management interface independently of collaborative content management system 110. In some embodiments, however, user client device 102a may provide the indication of user input to collaborative content management system 110, whereupon collaborative content management system 110 then provides instructions to cause user client device 102a to delete the graphical element from the collaborative content management interface so that user client device 102a no longer displays the graphical element within the collaborative content management interface.

In response to receiving an indication of the user input to delete a graphical element, collaborative content management system 110 performs act 254 to cause file management system 112 to delete or remove the corresponding file from file database 114. To elaborate, collaborative content management system 110 provides instructions to delete the file that corresponds with the deleted graphical element from the folder or subfolder in which the file is located within file database 114.

In response to the instructions to delete the file, file management system performs act 256 to delete the file that corresponds with the removed graphical element. As mentioned above, user 106a can perceive this change within file database 114 by way of file management application 105 that shows an updated view of a folder hierarchy, no longer including the file that corresponds with the removed graphical element.

Additionally, user client device 102a performs act 258 to provide user input to delete a header from the collaborative content management interface. In particular, user client device 102a receives user input by one or more of the methods and techniques described above. User client device 102a then provides an indication of the user input to collaborative content management system 110. User client device 102a further deletes the header from the collaborative content management interface either independently of receiving further instruction from collaborative content management system 110, or else in response to receiving instructions to do so from collaborative content management system 110.

Upon receiving the indication of user input to delete the header, collaborative content management system 110 performs act 260 to cause file management system 112 to delete the subfolder that corresponds with the deleted header. More particularly, collaborative content management system 110 provides instructions to move any files located within the subfolder out of the subfolder and to then delete the subfolder from file database 114. For instance, collaborative content management system 110 provides instructions to move any files that, before the header is deleted, correspond with graphical elements that appear below the header to a different subfolder that corresponds with a header under which the graphical elements appear after the header is deleted. Or, if there is no such header under which the graphical elements appear after the header is deleted, collaborative content management system 110 provides instructions to move the files into the main folder depicted by the collaborative content management interface.

Accordingly, collaborative content management system 110 provides instructions to empty the subfolder that is to be deleted. Collaborative content management system 110 further provides instructions to delete the subfolder that corresponds with the deleted header when the subfolder is empty.

As illustrated in FIG. 2C, file management system 112 performs act 262 to move files from the subfolder that corresponds with the deleted header. As mentioned, to prevent any undesired loss of files, file management system 112 moves the files out of the subfolder before deleting the subfolder. As also mentioned, and as will be discussed in further detail below, user client device 102a displays the changes (e.g., the moved files and the removal of the deleted subfolder) within file management application 105.

In addition, file management system 112 performs at 264 to delete the subfolder that corresponds with the deleted header. Indeed, as described above, file management system 112 deletes the subfolder once the subfolder is empty of any files that correspond with graphical elements within the collaborative content management interface.

The above discussion, including FIGS. 2A-2C relates to example process and methods that user client device 102a, collaborative content management system 110, and file management system 112 can perform in accordance with this disclosure. Hereafter, FIGS. 3A-3B illustrate another sequence of still other examples of process of methods that user client device 102a, collaborative content management system 110, and file management system 112 may perform in accordance with this disclosure.

Figure 3A:
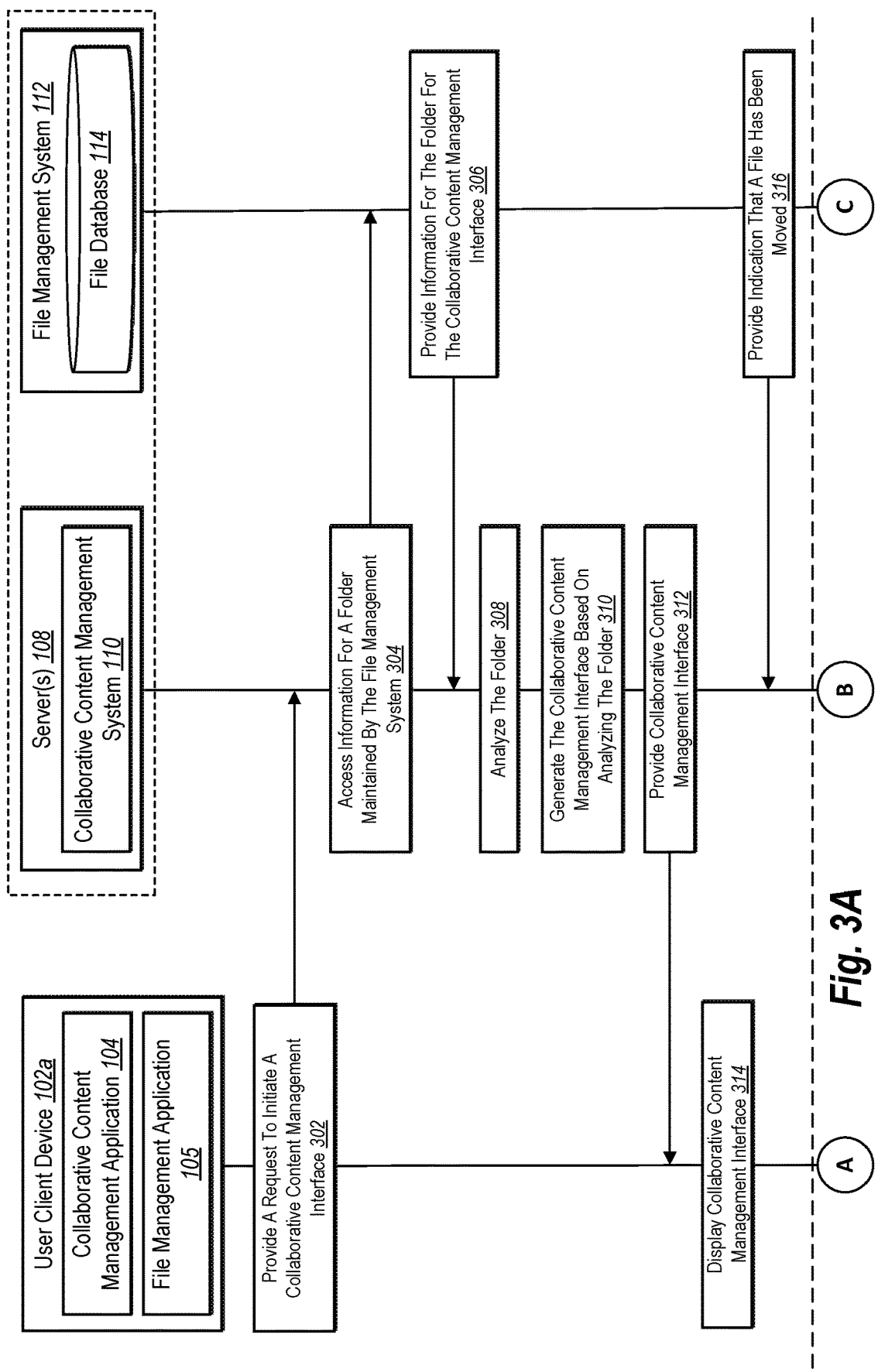
FIGS. 3A-3B illustrate a sequence flow for providing a collaborative content management interface in accordance with one or more embodiments.
Figure 3B:
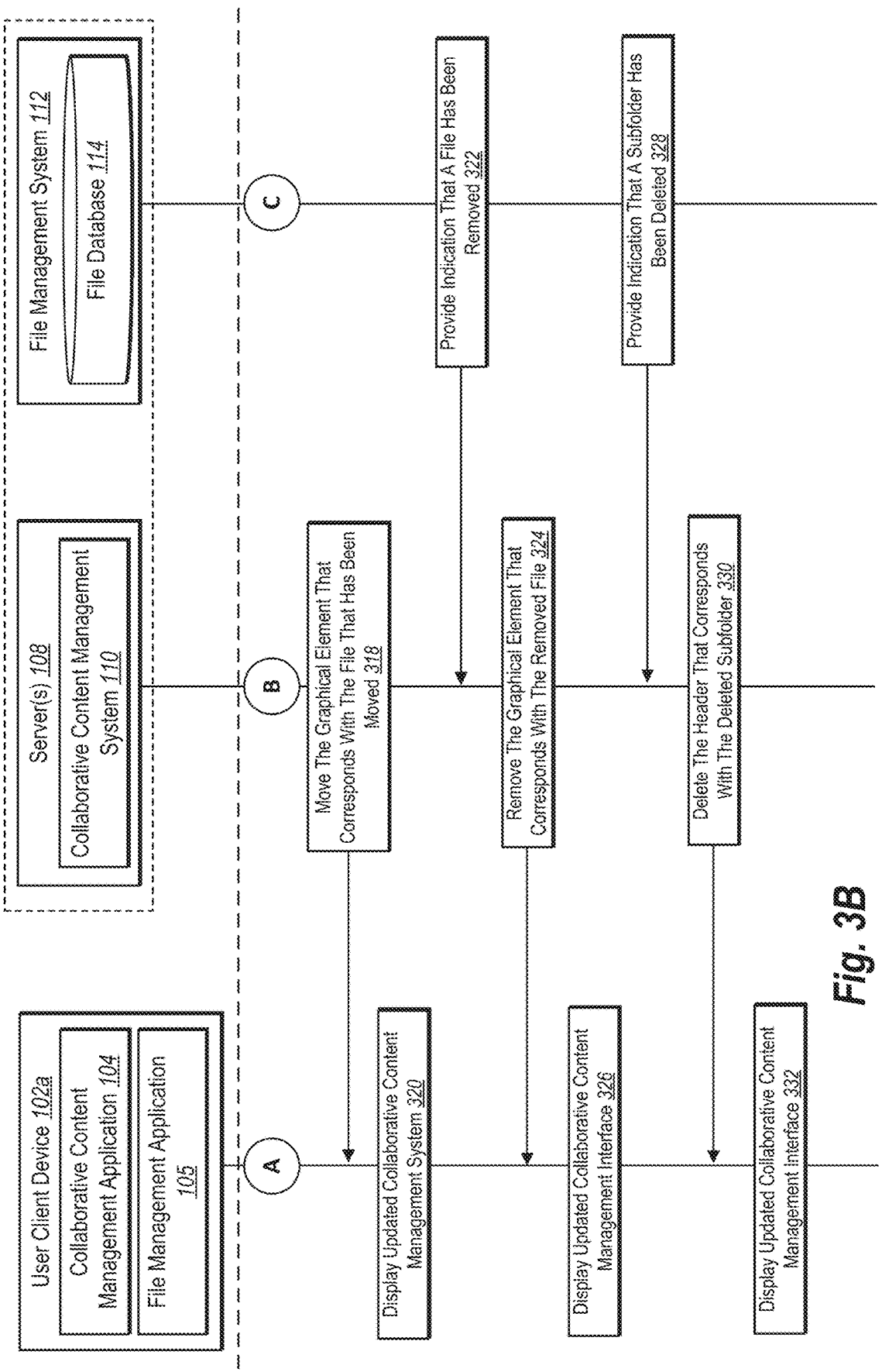

As illustrated in FIG. 3A, user client device 102a performs act 302 to provide a request to initiate a collaborative content management interface. In particular user client device 102a receives or detects user input (e.g., by way of file management application 105) to open collaborative content management application 104 for (e.g., to depict) a folder on user client device 102a. For example, user client device 102a detects a user input (e.g., by way of user selectable element within file management application 105) to instantiate collaborative content management application 104 for a folder within file database 114 maintained by file management system 112. In addition, user client device 102a provides an indication of the request to initiate a collaborative content management interface to collaborative content management system 110.

In response to receiving the request to initiate a collaborative content management interface, collaborative content management system 110 performs act 304 to access information for the particular folder requested by user 106a. In particular, collaborative content management system 110 communicates with file management system 112 to access information pertaining to the requested folder so that collaborative content management system 110 can provide the necessary information for user client device 102a to render the collaborative content management interface to include any graphical elements, headers, etc., that correspond with files and/or subfolders located within the requested folder.

As illustrated, file management system 112 performs act 306 to provide the requested information for the folder to collaborative content management system 110 in response to receiving a request to access the information. As mentioned, file management system 112 provides information relating to any files located inside the folder, including file names, sizes, types, date create, dates modified, and other relevant file-related metadata. File management system 112 also provides information relating to any subfolders within the requested folder such as subfolder names, sizes, etc.

In response to receiving the requested information, collaborative content management system 110 performs act 308 to analyze the folder contained within file database 114. Based on analyzing the folder, collaborative content management system 110 determines the attributes of the folder, the files within the folder, and the subfolders within the folder. For example, collaborative content management system 110 determines the names of files, sizes of files, types of files, and other information. Collaborative content management system 110 also determines the names of subfolders and the names, sizes, and types of any files within the subfolders.

Based on the information gathered by analyzing the folder in act 308, collaborative content management system 110 further performs act 310 to generate a collaborative content management interface. In particular, collaborative content management system 110 generates a collaborative content management interface to include graphical elements that correspond with the files identified within the folder. In addition, collaborative content management system 110 generates headers within the collaborative content management interface that correspond with subfolders identified within the requested folder as well.

Collaborative content management system 110 further arranges the graphical elements and headers for the collaborative content management interface. For instance, collaborative content management system 110 names each graphical element with the name identified on the corresponding file within file database 114, and likewise names each header. Collaborative content management system 110 also places each graphical element under those headers that correspond to the subfolders in which the corresponding files reside.

Upon generating the collaborative content management interface, collaborative content management system 110 performs act 312 to provide the collaborative content management interface to user client device 102a. In particular, collaborative content management system 110 provides the information necessary to map each graphical element to its corresponding file within file system 114 as well as each header to its corresponding subfolder. Collaborative content management system 110 further provides the information necessary to properly place each graphical element and header within the collaborative content management interface as displayed on a display screen of user client device 102a.

In response to receiving the collaborative content management interface, user client device 102a performs act 314 to display the collaborative content management interface to user 106a. In particular, user client device 102a displays the collaborative content management interface including each graphical element and header placed in particular locations within the display screen relative to each other, as described above.

As further illustrated in FIG. 3A, file management system 112 performs act 316 to provide an indication that a file has been moved. In particular, file management system 112 may detect that user 106a has moved, using file management application 105, a file from one subfolder to another, or from the main folder to a subfolder, or otherwise. In either case, file management system 112 provides an indication that a file within the folder maintained in file database 114 has been moved.

Based on receiving the indication that a file has been moved, collaborative content management system 110 performs act 318 to move the graphical element that corresponds with the file that has been moved. To illustrate, if collaborative content management system 110 determines that a file has been moved from a first subfolder to a second subfolder within file database 114, then collaborative content management system 110 likewise provides instructions to move the graphical element that corresponds with the file from under (e.g., below) a first header to under a second header within the collaborative content management interface.

Continuing the discussion of the sequence flow from FIG. 3A to FIG. 3B, user client device 102a performs act 320 to display the updated collaborative content management interface. In particular, user client device 102a receives the instructions to move the graphical element to a new location within the collaborative content management interface based on the movement of the file within file database 114. Upon receiving these instructions, user client device 102a updates the collaborative content management interface to display the graphical element in the new location. For example, if the file was moved from a first subfolder to a second subfolder within file database 114, user client device 102a displays the updated collaborative content management interface by presenting the graphical element below the second header that corresponds to the second subfolder.

In addition, file management system 112 performs act 322 to provide an indication that a file has been removed. In particular, file management system 112 detects a user input by way of file management application 105 to delete or otherwise remove a file from the folder depicted by the collaborative content management interface. For example, file management system 112 may detect a user input to delete a file from within a subfolder.

Based on the indication that user 106a has provided user input to delete the file from the folder, collaborative content management system 110 performs act 324 to remove the corresponding graphical element from the collaborative content management interface. In particular, collaborative content management system 110 provides instructions to user client device 102*a* to remove the graphical element that corresponds to the deleted file from the collaborative content management interface. As an example, if user 106*a* deletes a file from within a particular subfolder, then collaborative content management system 110 provides instructions to remove, within the collaborative content management interface, the corresponding graphical element from under a header that corresponds to the particular subfolder.

Indeed, as shown, user client device 102*a* performs act 326 to display the updated collaborative content management interface. As described, user client device 102*a* receives the instructions from collaborative content management system 110 to delete or remove the graphical element from the collaborative content management interface, and user client device 102*a* removes the graphical element accordingly so that it no longer appears within the collaborative content management interface.

As further illustrated in FIG. 3B, file management system 112 performs act 328 to provide an indication that a subfolder within the folder depicted by collaborative content management interface has been deleted. In particular, file management system 112 detects user input by way of file management application 105 to delete a subfolder from within the folder maintained in file database 114. In addition, file management system 112 provides the indication of the user input to delete subfolder to collaborative content management system 110.

In response to receiving the indication that user 106*a* has deleted the subfolder from within the folder maintained by file management system 112, collaborative content management system 110 performs act 330. In particular, collaborative content management system 110 performs act 330 to delete the header that corresponds with the deleted subfolder. For example, collaborative content management system 110 provides instructions to user client device 102*a* to delete the header that corresponds with the subfolder from the collaborative content management interface.

As illustrated in FIG. 3B, user client device 102*a* performs act 332 to update the collaborative content management interface. For example, user client device 102*a* receives the information from collaborative content management system 110 to delete the header from the collaborative content management interface. User client device 102*a* removes the header that corresponds with the deleted subfolder from the collaborative content management interface so that the header no longer appears within the collaborative content management interface on the display screen of user client device 102*a*.

FIGS. 2A-2C and 3A-3B illustrate sequence flows of various process and acts that the collaborative content management system 110 can perform in accordance with this disclosure. Such process and acts include, but are not necessarily limited to, moving a graphical element, moving a file, moving a header, deleting a graphical element, deleting a file, deleting a subfolder, adding a graphical element, adding a new file, adding a new header, and adding a new subfolder. While FIGS. 2A-2C and 3A-3B illustrate the sequence flow, and the corresponding description provides insight as to how the collaborative content management system 110 performs the acts and methods described, FIGS. 2A-2C and 3A-3B do not illustrate the collaborative content management interface itself. Thus, FIGS. 4A-8B illustrate examples of the collaborative content management interface and a file management interface of file management application 105 associated with file management system 112 in accordance with the various acts and processes of the above-described sequence flows.

Figure 4A:
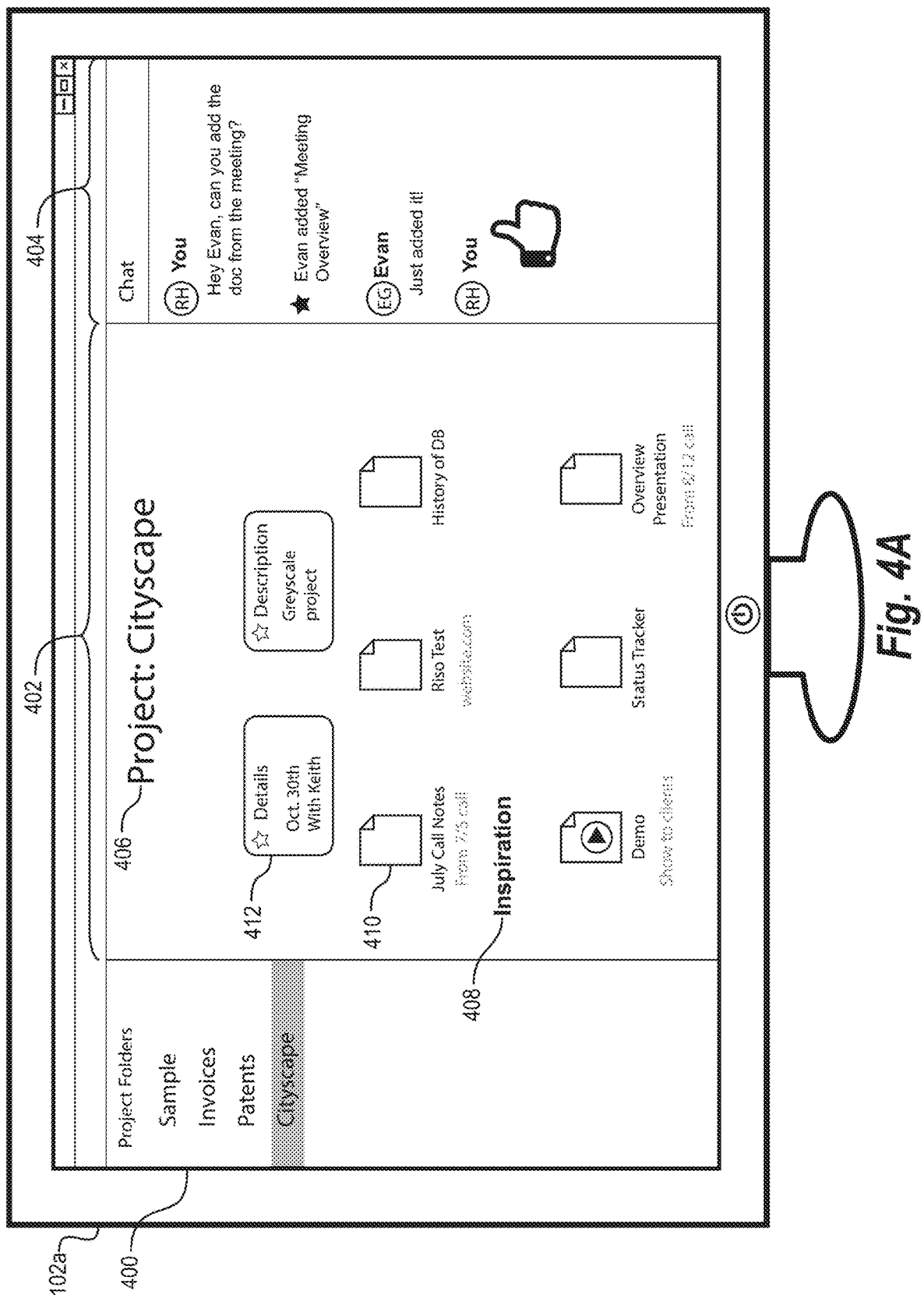
Figure 4B:
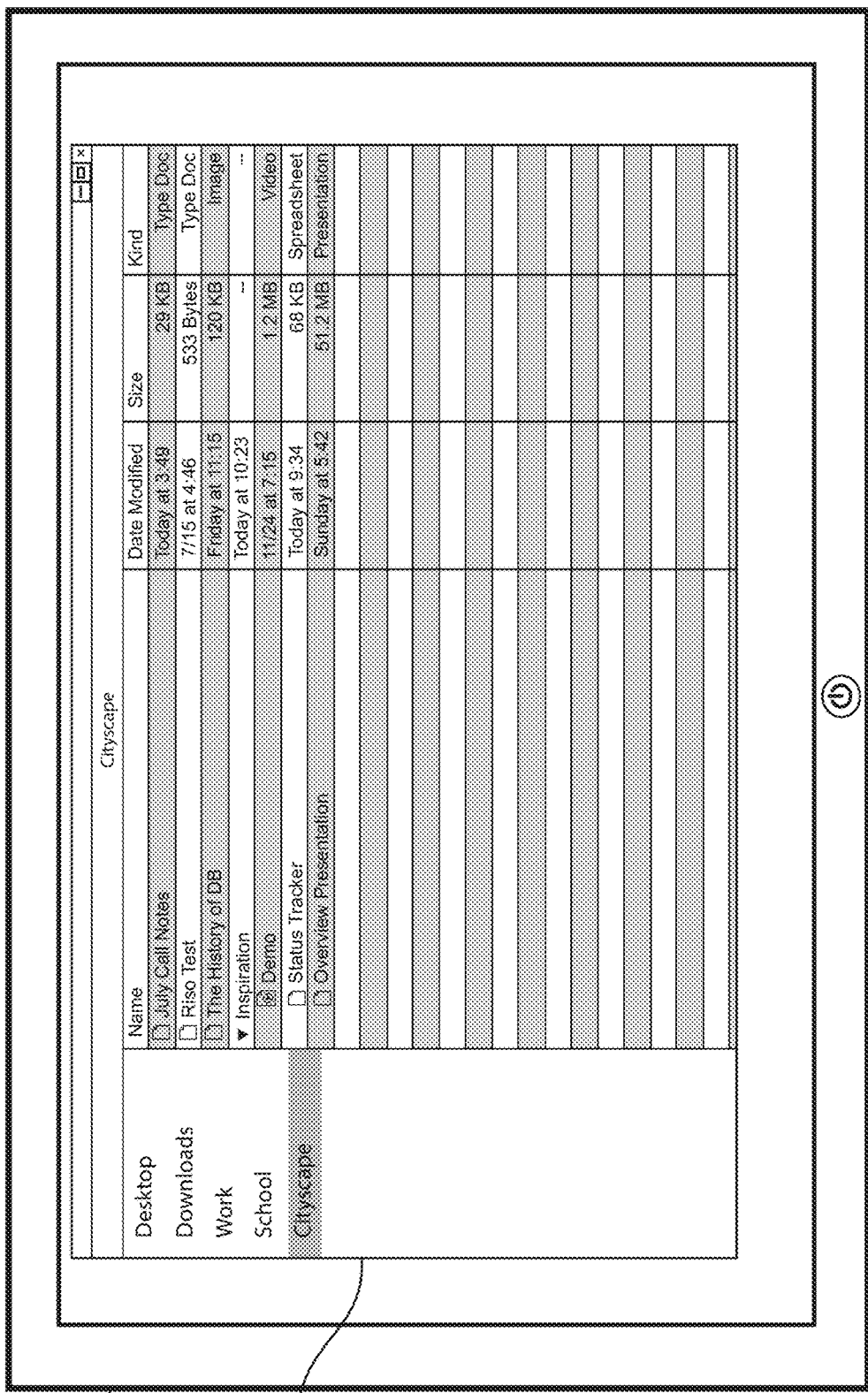

In particular, FIG. 4A illustrates user client device 102*a* presenting collaborative content management interface 400. FIG. 4B illustrates a corresponding view of file management interface 414 within file management application 105 displayed on user client device 102*a*. As illustrated in FIG. 4A, collaborative content management interface 400 includes content management portion 402 and activity monitor portion 404. As mentioned, content management portion 402 includes a display of various graphical elements (e.g., graphical element 410) that correspond with files maintained by file management system 112. Content management portion 402 further includes a header 408 ("Inspiration"), notepad 412, and folder name 406 ("Cityscape").

As illustrated in FIG. 4A as well as in subsequent figures, users 106 are operating within content management portion 402 that corresponds with a folder named "Cityscape" maintained by file management system 112. Accordingly, content management portion 402 includes a folder name 406. Graphical element 410 appears within content management portion 402 above the header 408. Therefore, the file named "July Call Notes" is correspondingly located within the file named "Cityscape," but outside the subfolder named "Inspiration" within file database 114

In addition, content management portion 402 includes notepad 412 that, in some embodiments, has no corresponding file maintained by file management system 112. Instead, notepad 412 may be metadata that collaborative content management system 110 generates for the collaborative content management interface. Thus, collaborative content management system 110 provides users 106 with additional information that is not necessarily part of file management system 112. In some embodiments, any of users 106 may interact with the notepad 412 to change its size, to edit its contents, move it, etc. Alternatively, notepad 412 may be private for a specific user. Accordingly, only user 106*a* may be able to edit or manipulate notepad 412, and notepad 412 may not appear within the collaborative content management interface as it appears to other users on their respective user client devices.

As mentioned above, activity monitor portion 404 include a feed or timeline of user activity that takes place within the collaborative content management interface. For example, activity monitor portion 404 includes chat messages as well as various actions ("Evan added 'Meeting Overview'") that take place within the collaborative content management interface. Accordingly, when users 106 communicate with each other by way of collaborative content management interface, activity monitor portion 404 displays the messages. Likewise, when any of users 106 make changes to files within the folder maintained by file management system 112, activity monitor portion 404 displays notifications of those changes as well. Indeed, activity monitor portion 404, like content management portion 402, updates in real time or near real time in accordance with the synchronization process of collaborative content management system 110.

As mentioned, and as illustrated in FIG. 4B, user client device 102*a* displays file management interface 414 of file management application 105. File management interface 414 includes a view of a folder contained in file database 114 as presented by file management application 105. As seen in file management interface 414 of FIG. 4B, the files whose graphical elements appear above the header 408 within the collaborative content management interface 400 of FIG. 4A are located within the "Cityscape" folder, but outside the "Inspiration" subfolder. On the other hand, those files whose graphical elements appear underneath (e.g., below) the header 408 within the collaborative content management interface 400 of FIG. 4A are located within the "Inspiration" subfolder within file database 414.

As illustrated in FIG. 5A, user client device 102a displays collaborative content management interface 400, as described above in relation to FIG. 4A. However, in FIG. 5A, user 106a is adding a new header 416 to collaborative content management interface 400. For example, user client device 102a receives user input to add header 416 at a location above header 408. Indeed, as shown, header 416 is located above graphical element 410, while header 408 is located above graphical element 418. As described above, adding the new header 416 in this way results in corresponding changes within file management system 112.

Figure 5B:
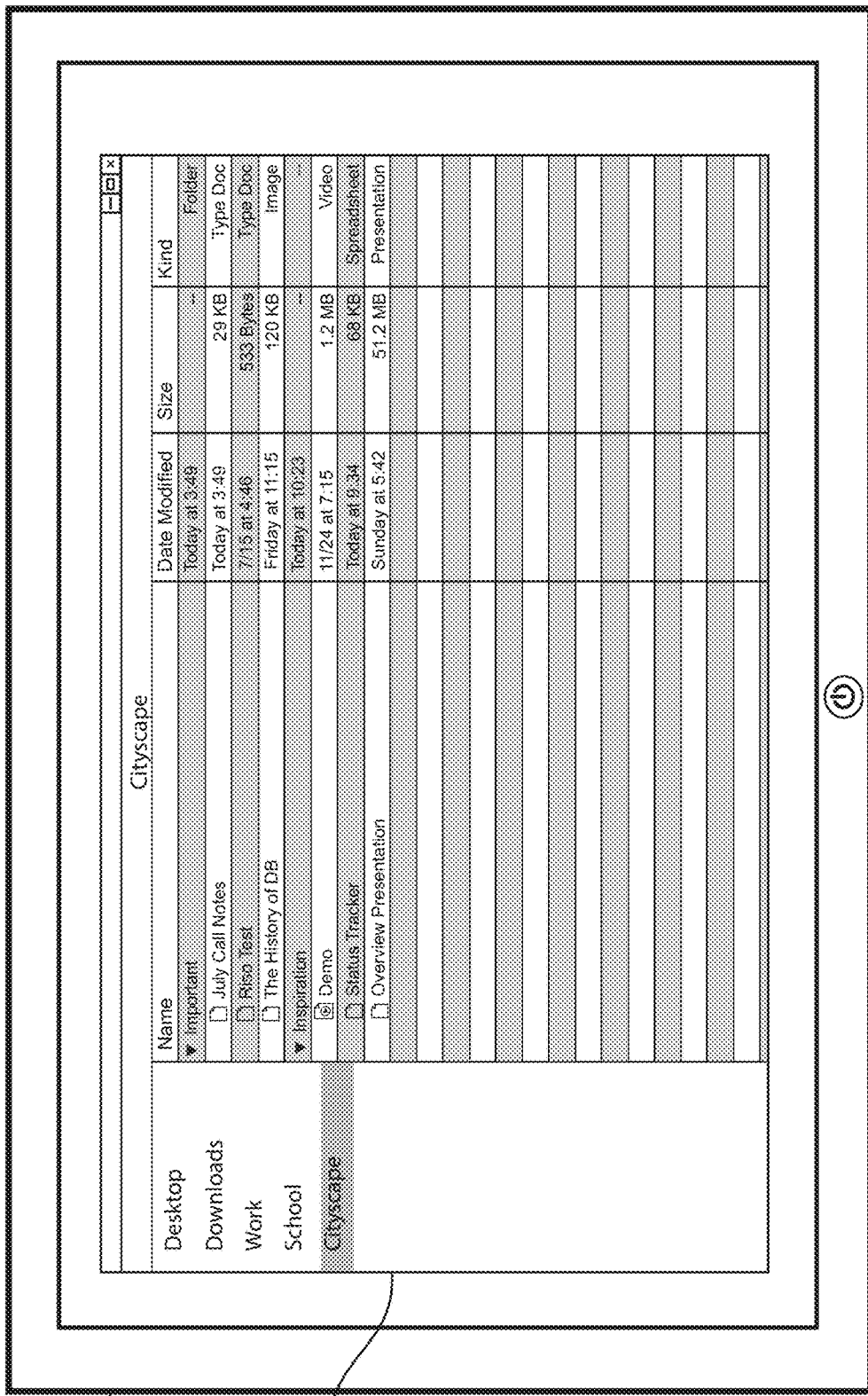

For instance, as illustrated in FIG. 5B, user client device 102a displays file management interface 414 of file management application 105. As shown in file management interface 414, collaborative content management system 110 provided instructions to create a new subfolder that corresponds with the new header 416. Indeed, subfolder "Important" appears within file management interface 414, where the files "July Call Notes," "Riso Test," and "The History of DB" appear within the subfolder because their corresponding graphical elements are below header 416 within collaborative content management interface 400. The files "Demo," "Status Tracker," and "Overview Presentation" that correspond with the graphical elements that appear below header 408 within collaborative content management interface 400 are located within the subfolder "Inspiration."

Figure 6A:
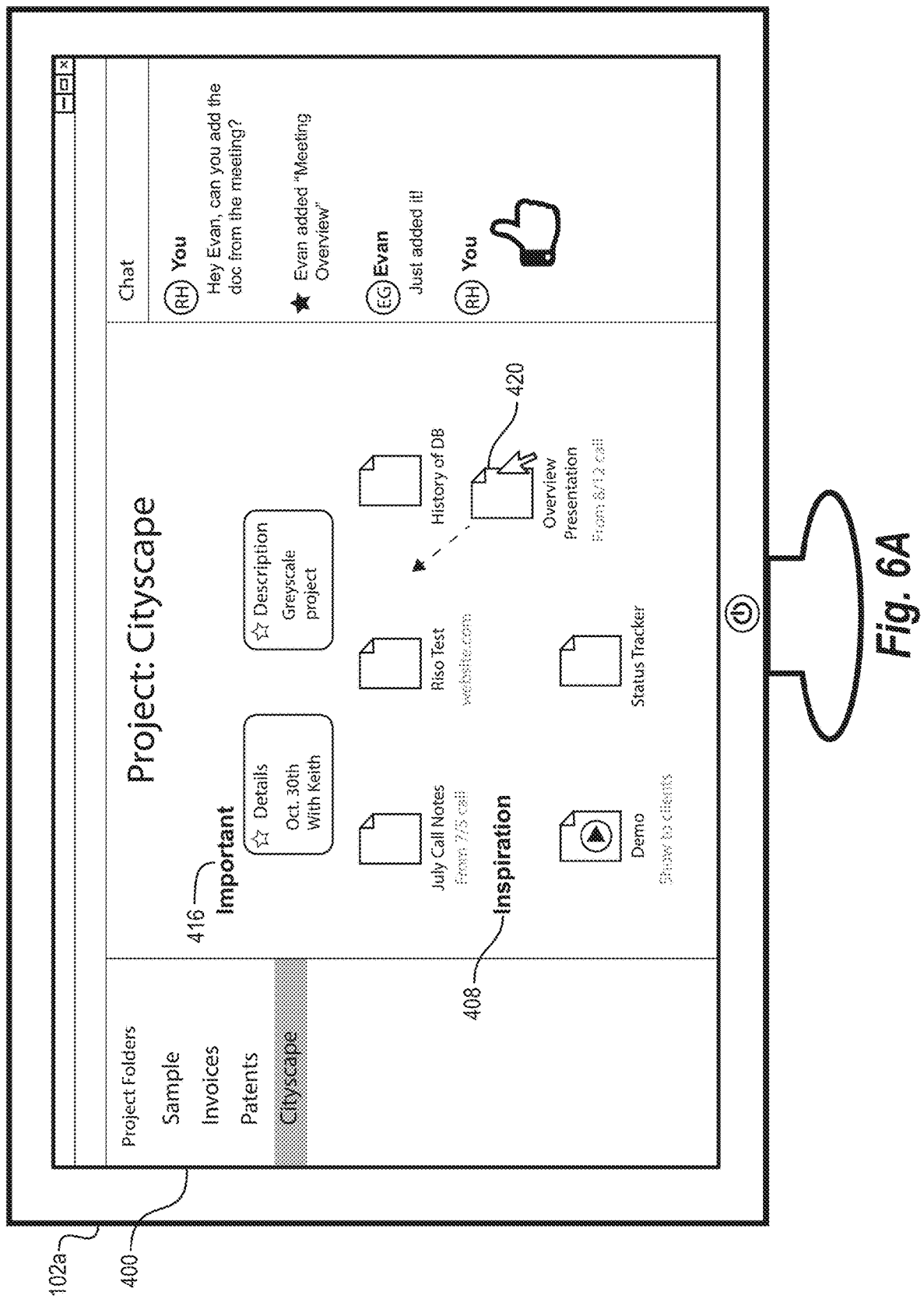

As illustrated in FIG. 6A, user client device 102a displays collaborative content management interface 400 including header 408 and header 416. In addition, collaborative content management interface 400 of FIG. 6A includes an animation of moving graphical element 420 from a location under header 408 to a location under header 416. As described above, user client device 102a receives user input to move graphical element 420 from the first location to the second location.

Figure 6B:
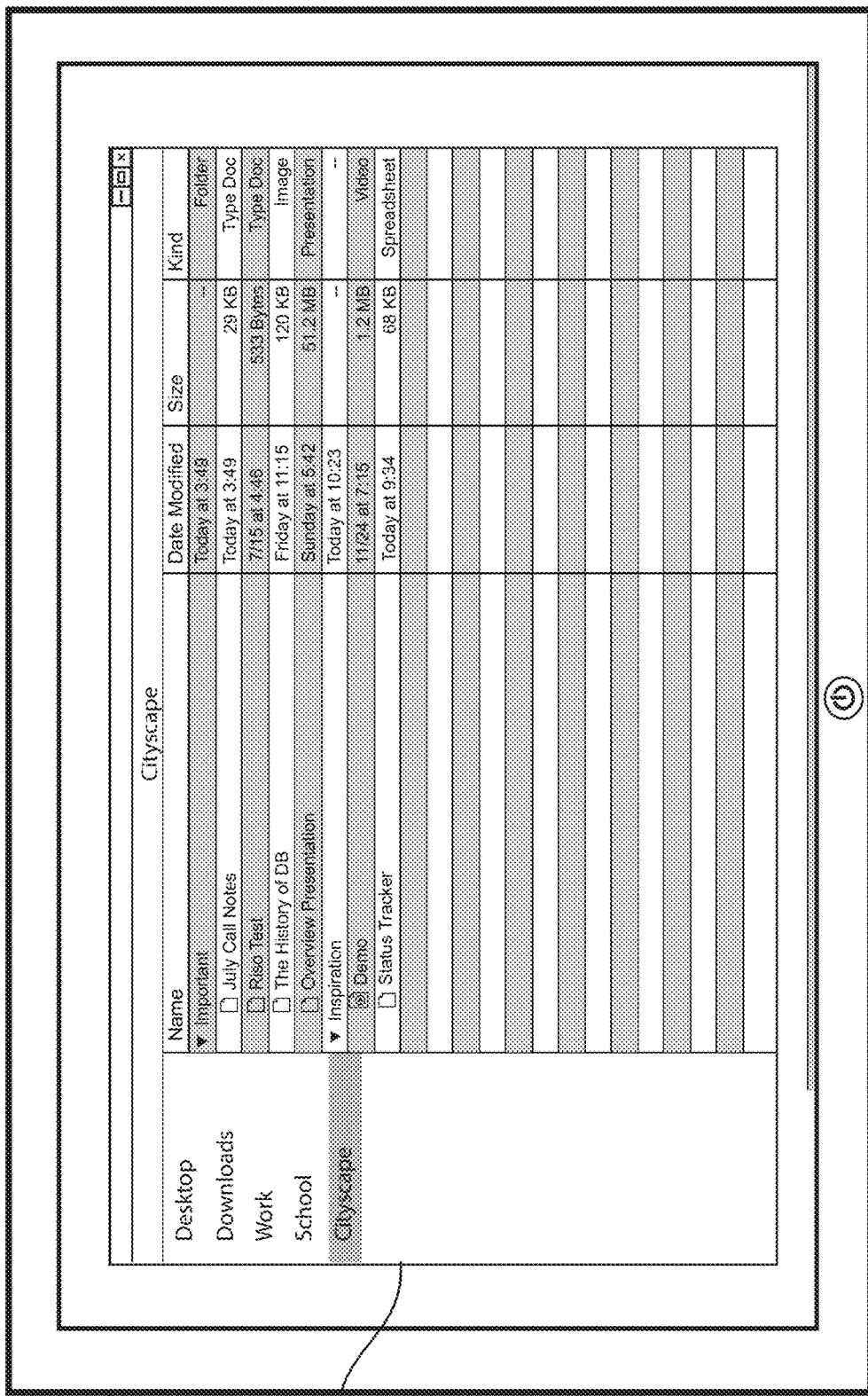

In conjunction with FIG. 6A, FIG. 6B illustrates file management interface 414 reflecting the changes made to collaborative content management interface 400. For example, file management interface 414 includes a view of the "Important" subfolder including the files that correspond with the graphical elements located below header 416 within collaborative content management interface 400. To elaborate, the "Important" subfolder includes the newly-added file "Overview Presentation" that corresponds with graphical element 420 that was moved from under header 408 to under header 416. Accordingly, the "Overview Presentation" file no longer appears within the subfolder "Inspiration" that corresponds with header 408 because graphical element 420 was moved out from below header 408.

Figure 7A:
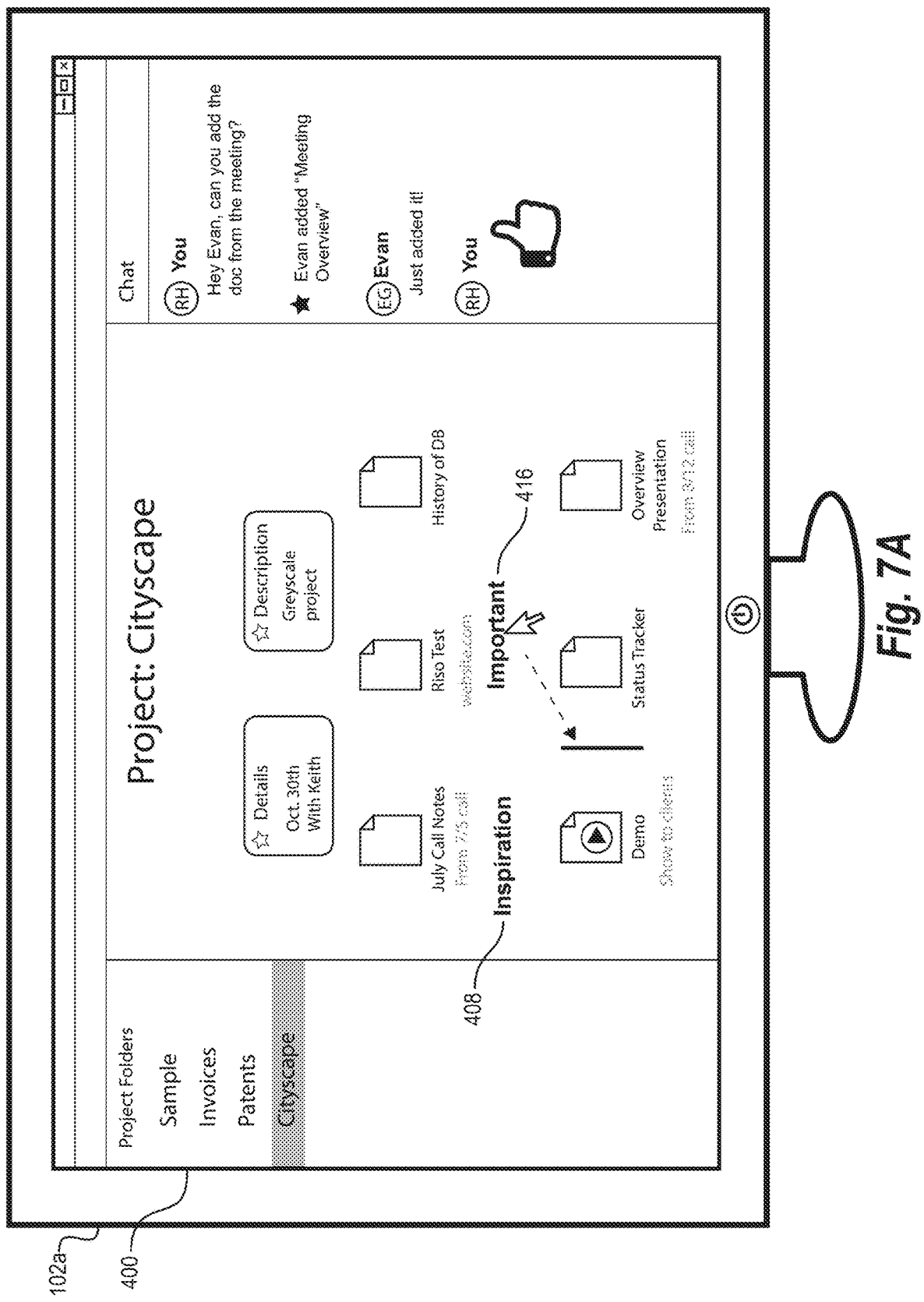

FIG. 7A illustrates user client device 102a displaying collaborative content management interface 400. As illustrated in FIG. 7A, collaborative content management interface 400 displays an animation or presentation reflecting user input to move header 416 from the previous location of FIG. 6A to a new location below header 408, between the "Demo" graphical element and the "Status Tracker" graphical element. For example, user client device 102a detects a touch-and-drag input or a select-and-drop (e.g., a tap or click to select and a second tap or click within a threshold time to drop) input to move header 416 within collaborative content management interface 400.

While FIG. 7A illustrates header 416 moving independently of any graphical elements, in some embodiments graphical elements move together with header 416. More specifically, in some embodiments graphical elements located below header 416 may be fixed to header 416 such that, should header 416 move within collaborative content management interface 400, the graphical elements move together with header 416 to remain located in the same position relative to header 416 (e.g., below header 416). For example, collaborative content management system 110 may enable a user to select a setting to lock any graphical elements located below header 416 to header 416 such that, in response to any user input to move header 416, collaborative content management system 110 causes the locked graphical elements to move together with header 416 within collaborative content management interface 400.

To illustrate the corresponding changes within file management system 112, FIG. 7B illustrates file management interface 414 of file management application 105 reflecting the changes that correspond with moving header 416 from its original location to the new location of FIG. 7A. In particular, file management interface 414 shows files "July Call Notes," "Riso Test," and "The History of DB" within the folder "Cityscape" but outside any subfolders. Indeed, collaborative content management system 110 causes file management system 112 to move these files because, by moving header 416 to its new location, these files are no longer below header 416.

In some embodiments, as mentioned above, the graphical elements below header 416 (e.g., "July Call Notes," "Riso Test," and "History of DB") move with header 416 as if locked in place relative to header 416. In these embodiments, collaborative content management system 110 does not cause file management system 112 to move any corresponding files within file database 114 out of a subfolder that corresponds with header 416 because the graphical elements remain located in the same position as before, relative to header 416. However, in these embodiments, collaborative content management system 110 may cause file management system 112 to move the subfolder that corresponds with header 416, along with the files located therein, to a position within file management interface 414 below header 408.

In addition, because files "Status Tracker" and "Overview Presentation" are below header 416 at its new location, file management interface 414 of FIG. 7B shows these files within the "Important" subfolder that corresponds with header 416. Indeed, as described above, collaborative content management system 110 causes file management system 112 to move the files "Status Tracker" and "Overview Presentation" from the subfolder "Inspiration" to the subfolder "Important." Collaborative content management system 110 causes file management system 112 to maintain file "Demo" within the subfolder "Inspiration" that corresponds with header 408.

Figure 8A:
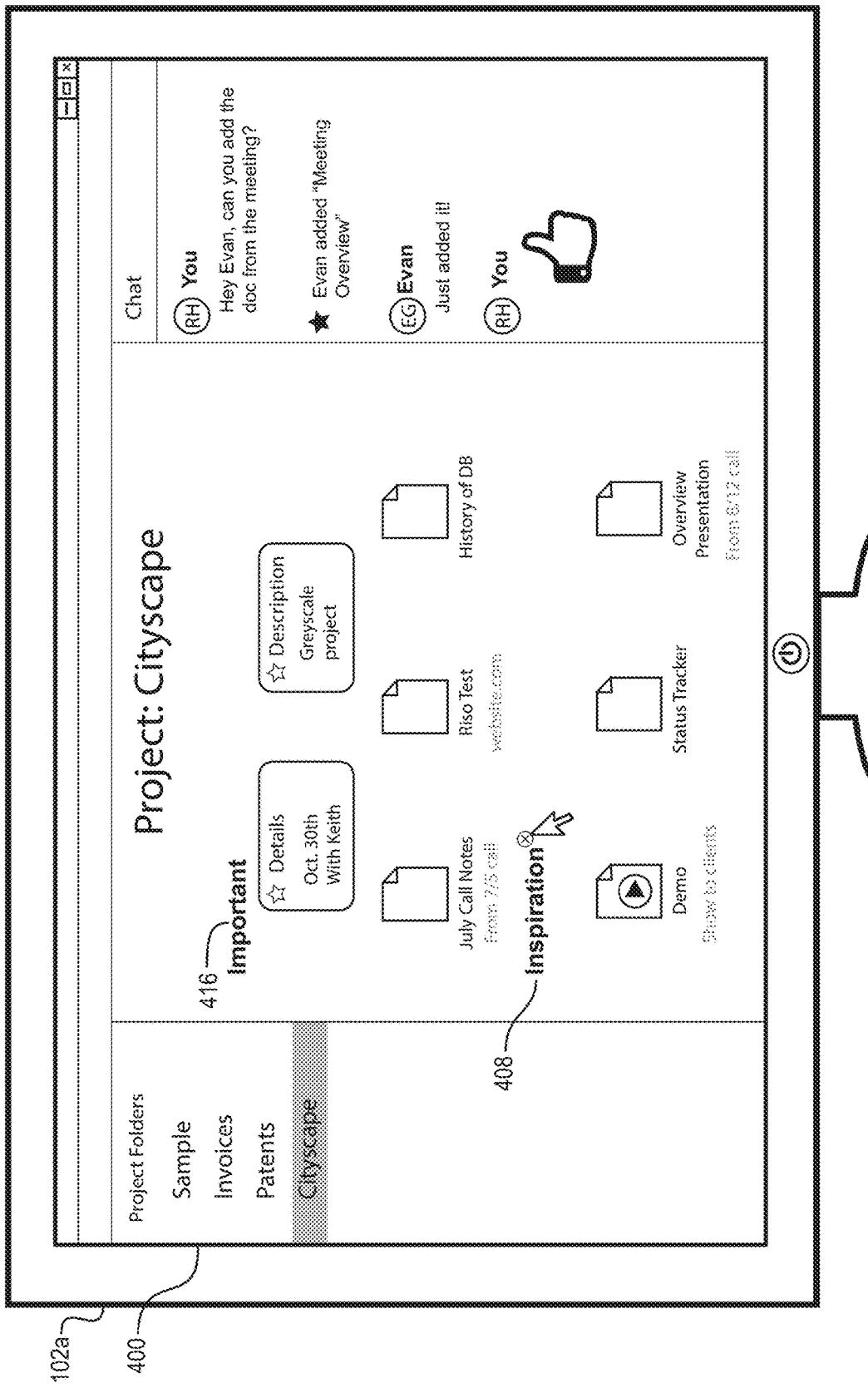

FIG. 8A illustrate user input 102a displaying collaborative content management interface 400 whereby user 106a provides user input to delete header 408. As shown, user client device 102a receives user input to delete header 408 by clicking or touching the "X" to remove header 408. Upon removing header 408, collaborative content management system 110 causes file management system 112 to make corresponding changes within file database 114.

Figure 8B:
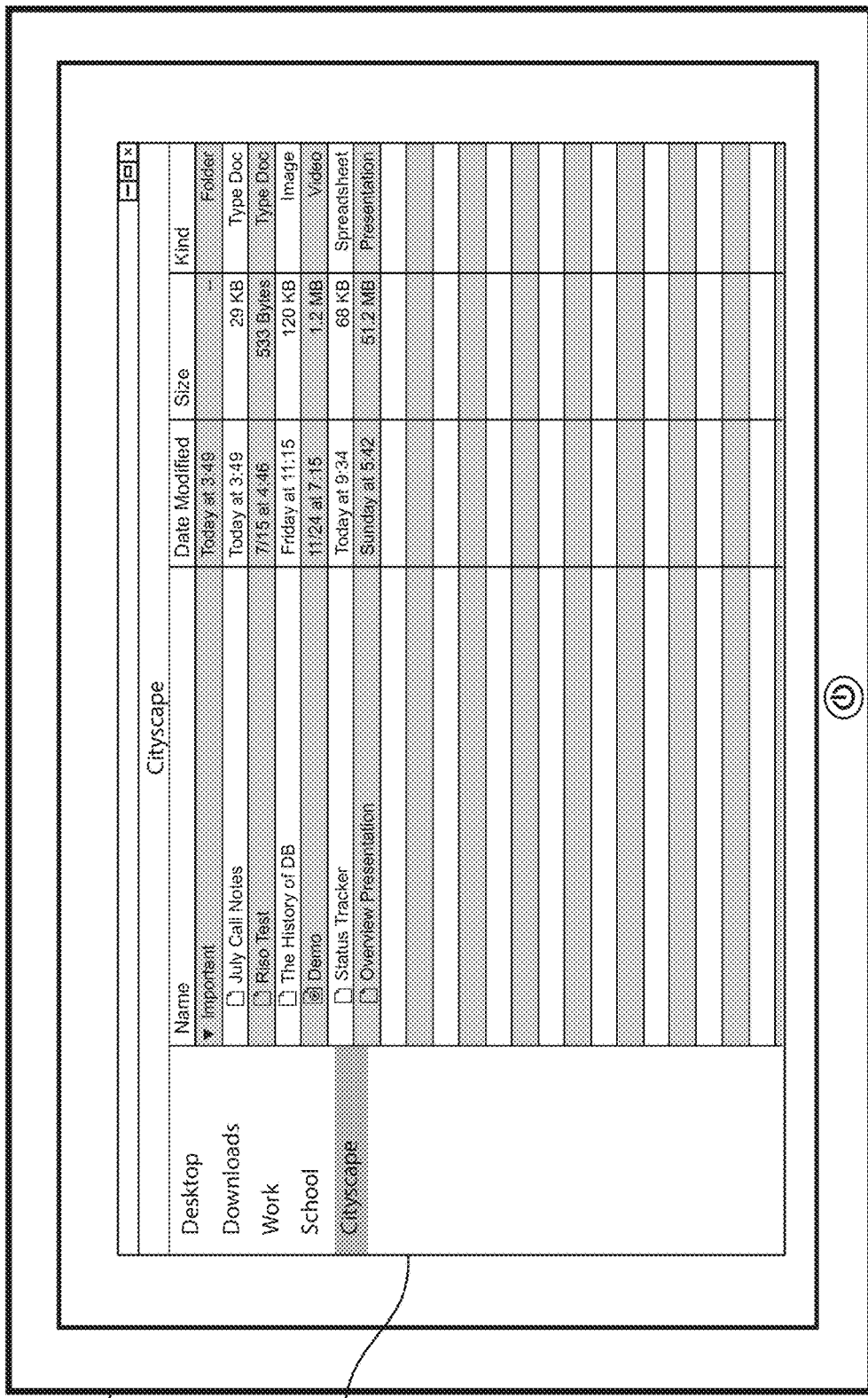
Figure 8B:
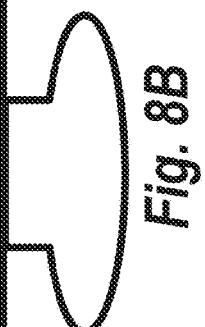

To reflect the changes of collaborative content management interface 400 within FIG. 8A, FIG. 8B illustrates file management interface 414 reflecting the respective changes. As illustrated, collaborative content management system 110 causes file management system 112 to delete the subfolder "Inspiration" in response to the user input to remove header 408 from collaborative content management interface 400. Additionally, collaborative content management system 110 causes file management system 112 to move the files that correspond with the graphical elements that were below header 408 before it was deleted. Accordingly, file management system 112 moves the files "Demo," "Status Tracker," and "Overview Presentation" to the subfolder "Important" because, after deleting header 408, the corresponding graphical elements are now located below header 416.

FIGS. 4A-8B illustrate various views of collaborative content management interface 400 and file management interface 414 in relation to different processes and methods for manipulating graphical elements, headers, files, and subfolders. In particular, FIGS. 4A-8B illustrate views from the perspective of receiving user input by way of collaborative content management interface 400 and causing corresponding changes within file management system 112. Hereafter, FIGS. 9A-9B illustrate views of file management interface 114 and collaborative content management interface 400 from the perspective of initiating collaborative content management system 110 from within file management interface 414.

Figure 9A:
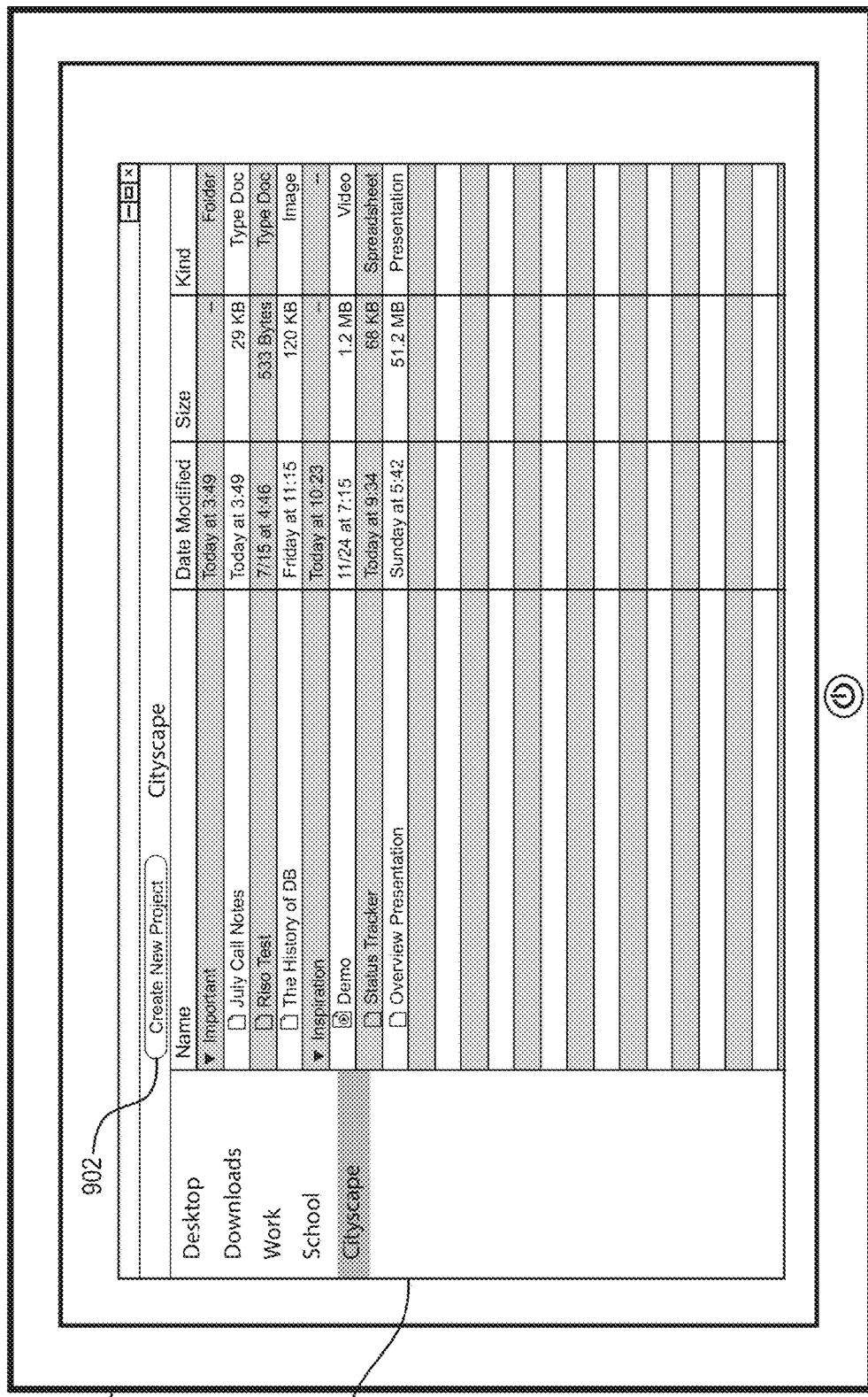

As illustrated in FIG. 9A, user client device 102a displays file management interface 414. In particular, file management interface 414 includes a presentation of the "Cityscape" folder maintained by file management system 112 within file database 114. Within the "Cityscape" folder, file management interface 414 includes the subfolders "Important" and "Inspiration," which each include files therein. As also shown in FIG. 9A, file management interface 414 includes a collaborative content management element 902. While FIG. 9A shows collaborative content management element 902 as a user selectable button within file management interface 414, in some embodiments collaborative content management element 902 can be an option within a menu (e.g., a drop-down menu) or some other user selectable digital object whereby a user can initiate collaborative content management system 110.

In response to detecting user input to select collaborative content management element 902, file management system 112 initializes collaborative content management system 110 and provides an indication of the user input to collaborative content management system 110. Collaborative content management system 110 thereafter analyzes the "Cityscape" folder and generates collaborative content management interface 400 of FIG. 9B based on that analysis.

Figure 9B:
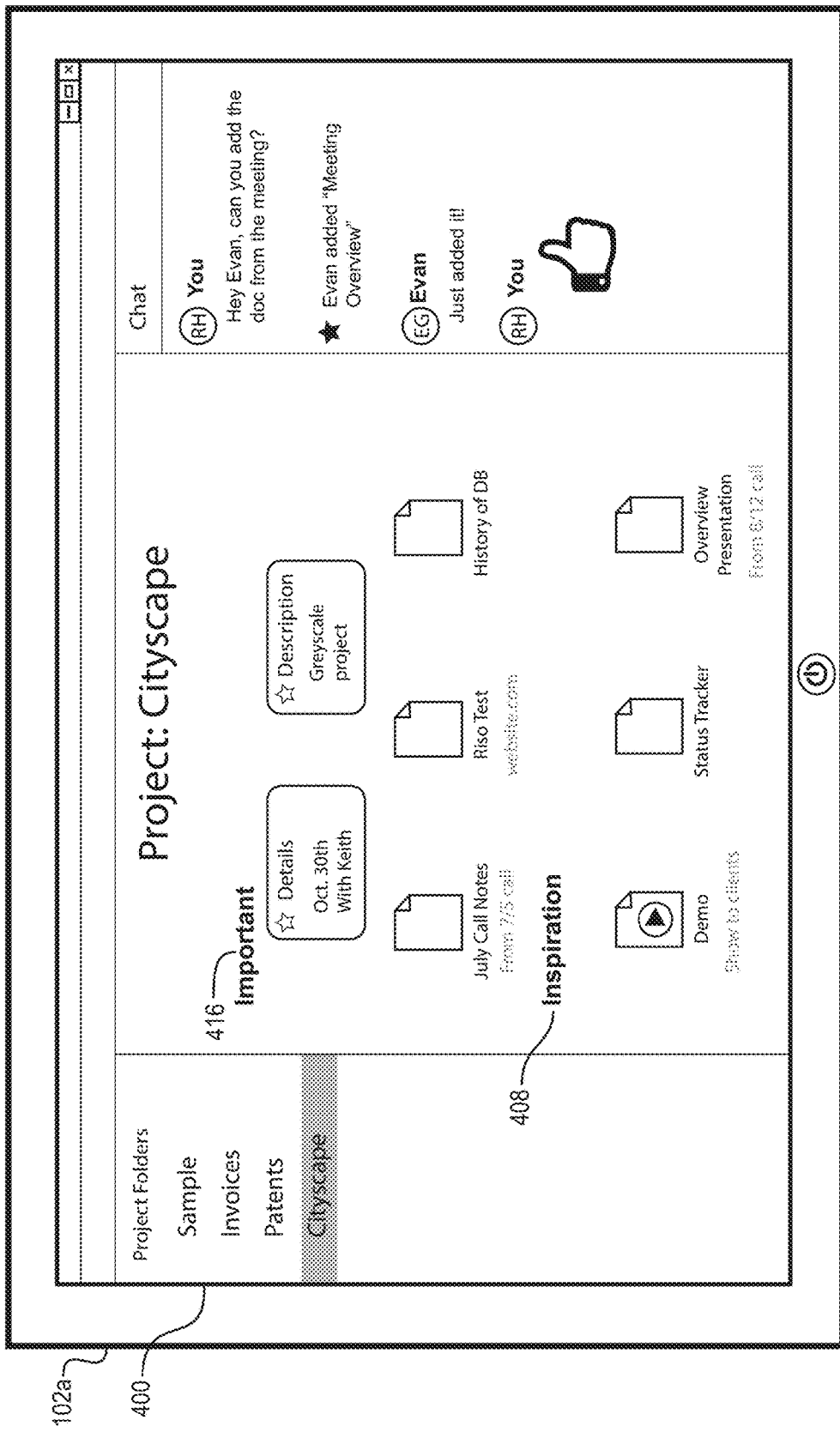

Indeed, as illustrated in FIG. 9B, collaborative content management system 110 generates collaborative content management interface 400 to depict the "Cityscape" folder including header 408 and header 416 that match the "Important" and "Inspiration" subfolders of FIG. 9A. Similarly, collaborative content management system 110 creates graphical elements to represent the files contained within the subfolders and places those graphical elements below their respective headers, as described in greater detail above in relation to FIGS. 3A-3B. Indeed, collaborative content management system 110 detects various changes to the "Cityscape" folder within file management system 112, and collaborative content management system 110 creates corresponding changes within collaborative content management interface 400 as described above.

Figure 10:
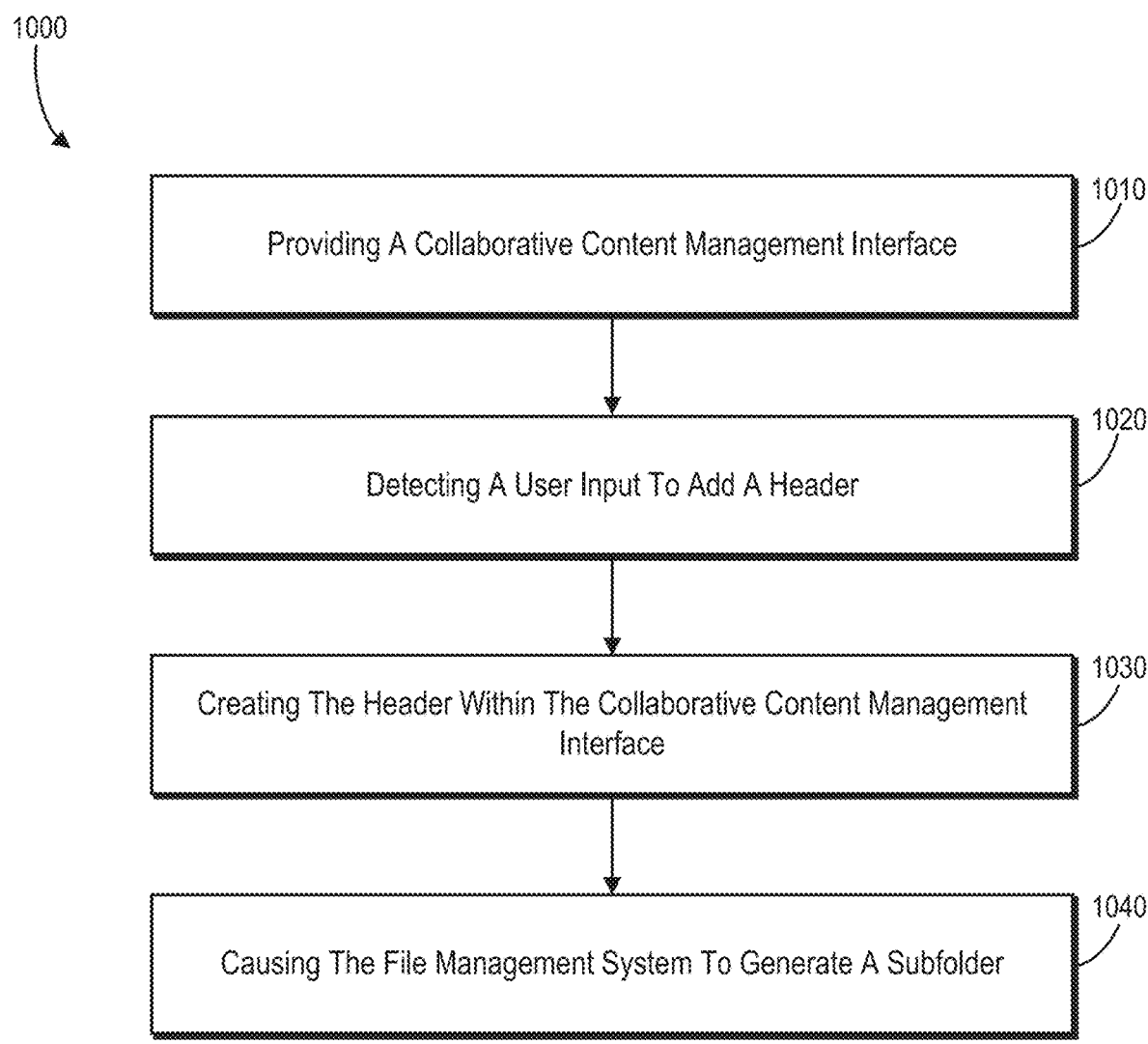
FIGS. 10-11 illustrate flowcharts of series of acts in methods of providing a collaborative content management interface in accordance with one or more embodiments.
Figure 11:
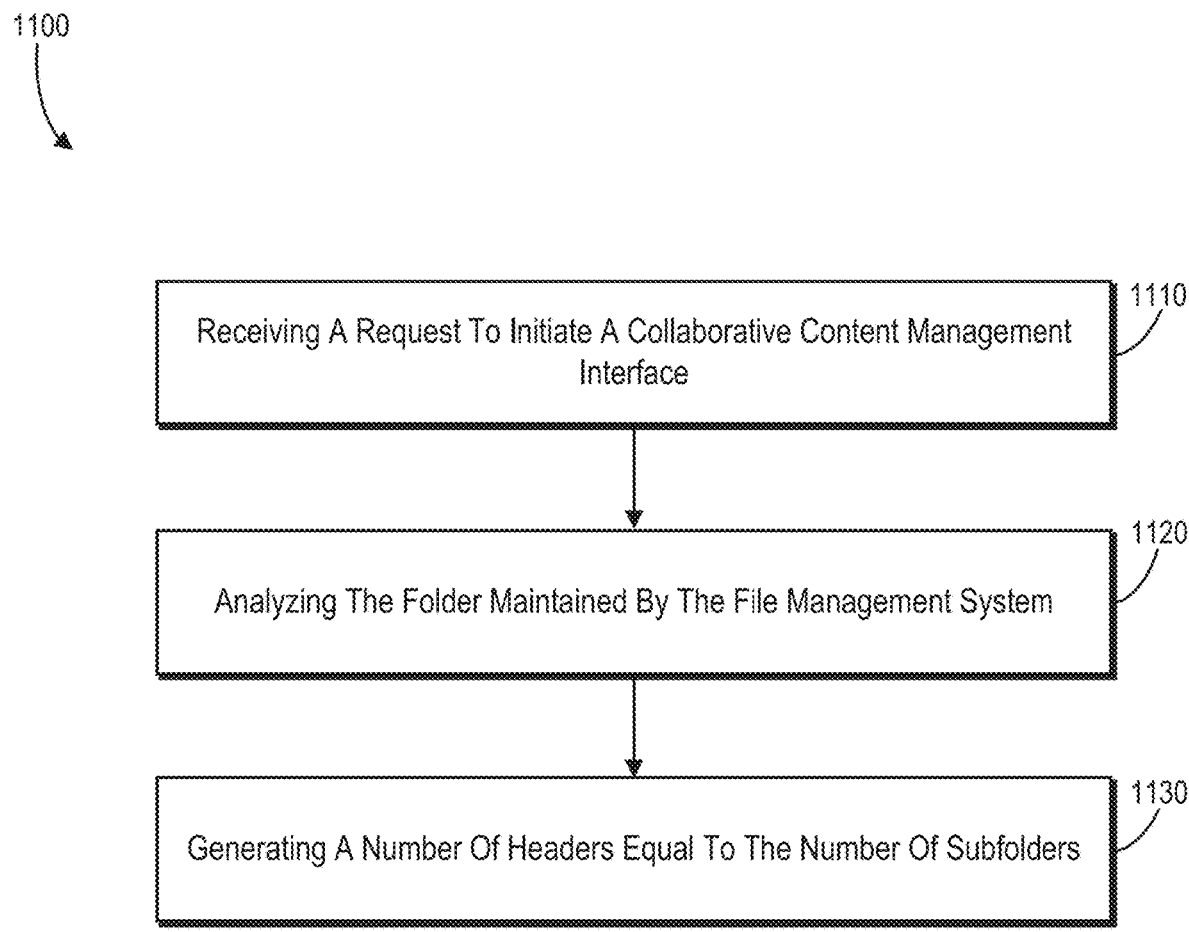

FIGS. 1-9B, the corresponding text, and the examples provide a number of different systems and methods for providing digital content to users based on composite utility scores. In addition to the foregoing, embodiments can also be described in terms of flowcharts comprising acts steps in a method for accomplishing a particular result. For example, turning now to FIGS. 10-11, these figures illustrate a flowchart of a series of acts 1000 of utilizing a machine learning model to provide digital content to a target audience of users. While FIGS. 10-11 illustrate acts according to some embodiments, alternative embodiments may omit, add to, reorder, and/or modify any of the acts shown in FIGS. 10-11. The acts of FIGS. 10-11 can be performed as part of a method. Alternatively, a non-transitory computer readable medium can comprise instructions, that when executed by one or more processors, cause a computing device to perform the acts of FIGS. 10-11. In still further embodiments, a system can perform the acts of FIGS. 10-11.

As illustrated in FIG. 10, series of acts 1000 may include act 1010 of providing a collaborative content management interface. In particular, act 1010 can involve providing, for display, a collaborative content management interface for a group of users to manage a folder of files maintained by a file management system, wherein the collaborative content management interface comprises a graphical element for each respective file within the folder. The collaborative content management interface can include a content management portion whereby the group of users can manage the graphical elements and an activity monitor portion that presents a timeline of user activity that takes place within the collaborative content management interface and that updates the timeline as the user activity occurs.

Series of acts 1000 may include act 1020 of detecting a user input to add a header. In particular, act 1020 may involve detecting, by at least one processor, a user input to add a header within the collaborative content management interface. The user input can indicate a first location within the collaborative content management interface, wherein, at the first location, at least one graphical element within the collaborative content management interface is below the header. Detecting user input to add the header within the collaborative content management interface can include receiving text input for a name of the header.

In addition, series of acts 1000 may include act 1030 of creating the header within the collaborative content management interface. In particular, act 1030 may involve in response to the detected user input, creating the header within the collaborative content management interface.

As shown, series of acts 1000 may also include act 1040 of causing the file management system to generate a subfolder. In particular, act 1040 can involve based on creating the header within the collaborative content management interface, causing the file management system to generate a subfolder within the folder maintained by the file management system and that corresponds with the created header. Causing the file management system to generate the subfolder can include causing the file management system to name the subfolder to match the name of the header.

Although not illustrated in FIG. 10, series of acts 1000 may further include an act of causing the file management system to move, into the generated subfolder, any files that correspond with the at least one graphical element that are below the header. In addition, series of acts 1000 can include an act of detecting a user input to add a second header at a second location within the collaborative content management interface, wherein the second location is above the first location, and can further include an act of, in response to the detected user input to add the second header at the second location, creating the second header at the second location within the collaborative content management interface. Based on creating the second header at the second location, series of acts 1000 can include acts of causing the file management system to generate a second subfolder within the folder maintained by the file management system and causing the file management system to move into the second subfolder any files that correspond with graphical elements that are above the first location and below the second location within the collaborative content management interface.

Furthermore, series of acts 1000 can include an act of detecting a user input to move the second header from the second location to a third location within the collaborative content management interface, wherein the third location is below the first location. Based on the detected user input to move the second header from the second location to the third location within the collaborative content management interface, series of acts 1000 can include acts of moving the second header from the second location to the third location within the collaborative content management interface, causing the file management system to remove, from the second subfolder, files that correspond with graphical elements that are above the first location and below the second location within the collaborative content management interface, causing the file management system to maintain, within the subfolder that corresponds with the header at the first location, files that correspond with graphical elements that are above the third location and below the first location within the collaborative content management interface, and causing the file management system to move, from the subfolder that corresponds with the header at the first location and into the second subfolder, files that correspond with graphical elements that are below the third location.

Additionally, series of acts 1000 can include an act of detecting a user input to move a graphical element from a location under the header at the first location to a location under the second header. In response to the detected user input to move the graphical element, series of acts 1000 can include acts of moving the graphical element from the location under the header at the first location to the location under the second header and causing the file management system to move, from the subfolder that corresponds with the header at the first location and into the second subfolder, a file that corresponds with the graphical element that was moved.

Still further, series of acts 1000 can include an act of detecting a user input to delete the header within the collaborative content management interface. In response to the detected user input to delete the header, series of acts 1000 can include acts of causing the file management system to move, from the generated subfolder and into the folder maintained by the file management system, the files that correspond with the at least one graphical element that are below the header, deleting the header within the collaborative content management interface, and causing the file management system to delete the subfolder within the folder maintained by the file management system and that corresponds with the deleted header.

As illustrated in FIG. 11, the series of acts 1100 may include act 1110 of receiving a request to initiate a collaborative content management interface. In particular, act 1110 can involve receiving a request to initiate a collaborative content management interface for a group of users to manage a folder of files maintained by a file management system, wherein the collaborative content management interface comprises a graphical element for each respective file within the folder.

Series of acts 1100 can further include act 1120 of analyzing the folder maintained by the file management system. In particular, act 1120 can involve in response to the request, analyzing the folder maintained by the file management system to identify a number of subfolders within the folder.

Additionally, series of acts 1100 can also include act 1130 of generating a number of headers equal to the number of subfolders. In particular, act 1130 can involve, based on analyzing the folder maintained by a file management system, generating, for display within the collaborative content management interface, a number of headers equal to the number of subfolders within the folder maintained by a file management system, wherein each header corresponds with a different subfolder.

Although not illustrated in FIG. 11, series of acts 1100 can further include an act of analyzing the subfolders within the folder maintained by the file management system to identify a name of each respective subfolder, as well as an act of, based on the identified name of each respective subfolder, naming each of the number of headers within the collaborative content management interface, each header name matches the name of the corresponding subfolder.

Furthermore, series of acts 1100 can include acts of analyzing the subfolders within the folder maintained by the file management system to identify any files contained within the subfolders, and providing, for display within the collaborative content management interface, a graphical element for each file contained within the subfolders, wherein each graphical element is presented below the header within the collaborative content management interface that corresponds to the subfolder in which the respective file is contained.

In addition, series of acts 1100 can include an act of receiving, from the file management system, an indication that a file has been removed from a subfolder within the folder maintained by the file management system and an act of, in response to the indication that the file has been removed, removing, from the collaborative content management interface, a graphical element that corresponds to the file that has been removed.

Series of acts 1100 can further include acts of receiving, from the file management system, an indication that a file has been moved from a first subfolder to a second subfolder and, in response to the indication that the file has been moved from the first subfolder to the second subfolder, moving, within the collaborative content management interface, a graphical element that corresponds to the file that was moved from below a first header that corresponds to the first subfolder to below a second header that corresponds to the second subfolder.

Still further, series of acts 1100 can include an act of receiving, from the file management system, an indication that a subfolder within the folder maintained by the file management system has been deleted. In response to the indication that the subfolder has been deleted, series of acts 1100 can include acts of deleting, from within the collaborative content management interface, a header that corresponds with the deleted subfolder and deleting, from within the collaborative content management interface, any graphical elements that corresponds with files that were contained within the deleted subfolder.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
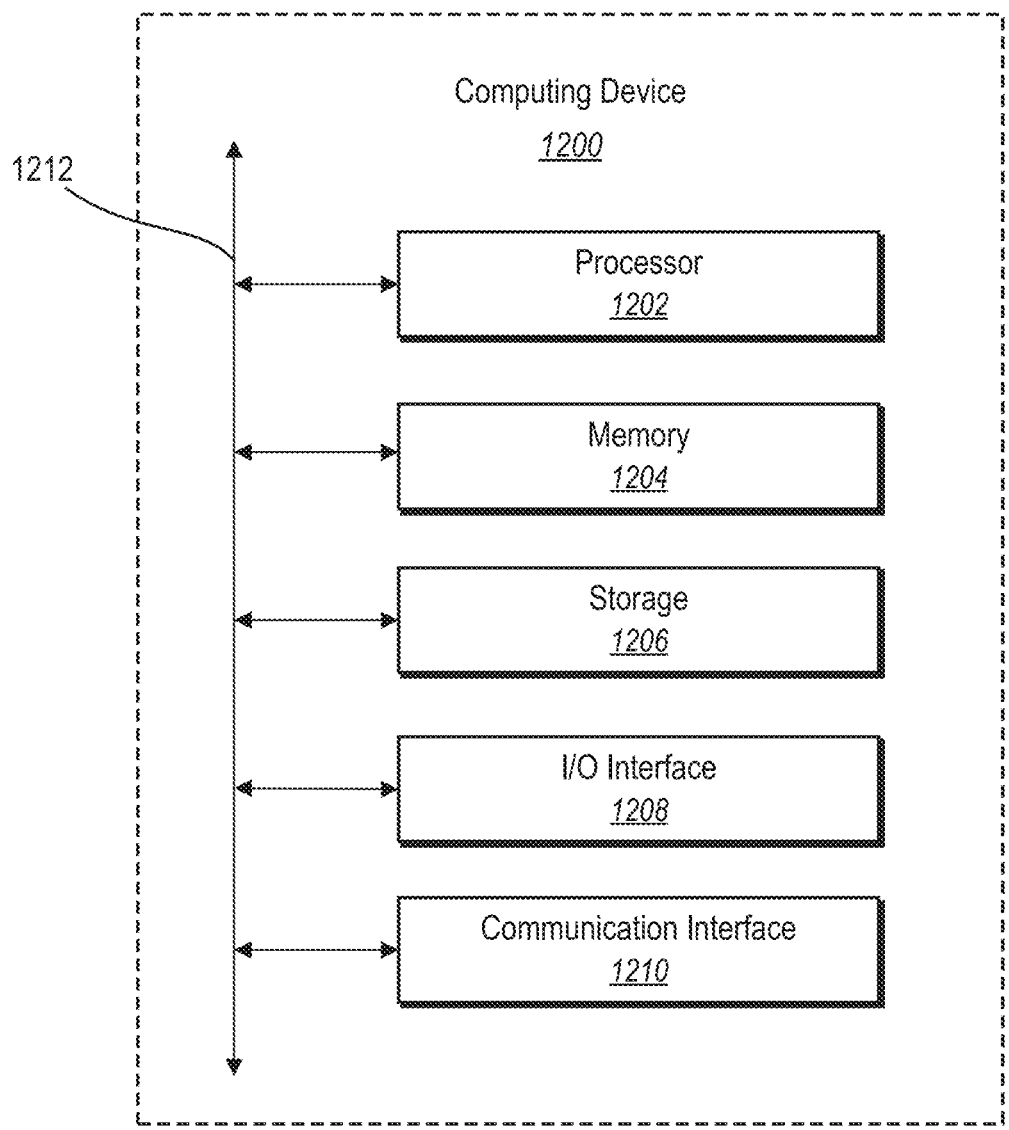
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that server(s) 108 and/or client devices 102 may comprise one or more computing devices such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting.

Additional or alternative components may be used in other embodiments. Furthermore, in certain embodiments, computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular embodiments, storage device 1206 is non-volatile, solid-state memory. In other embodiments, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
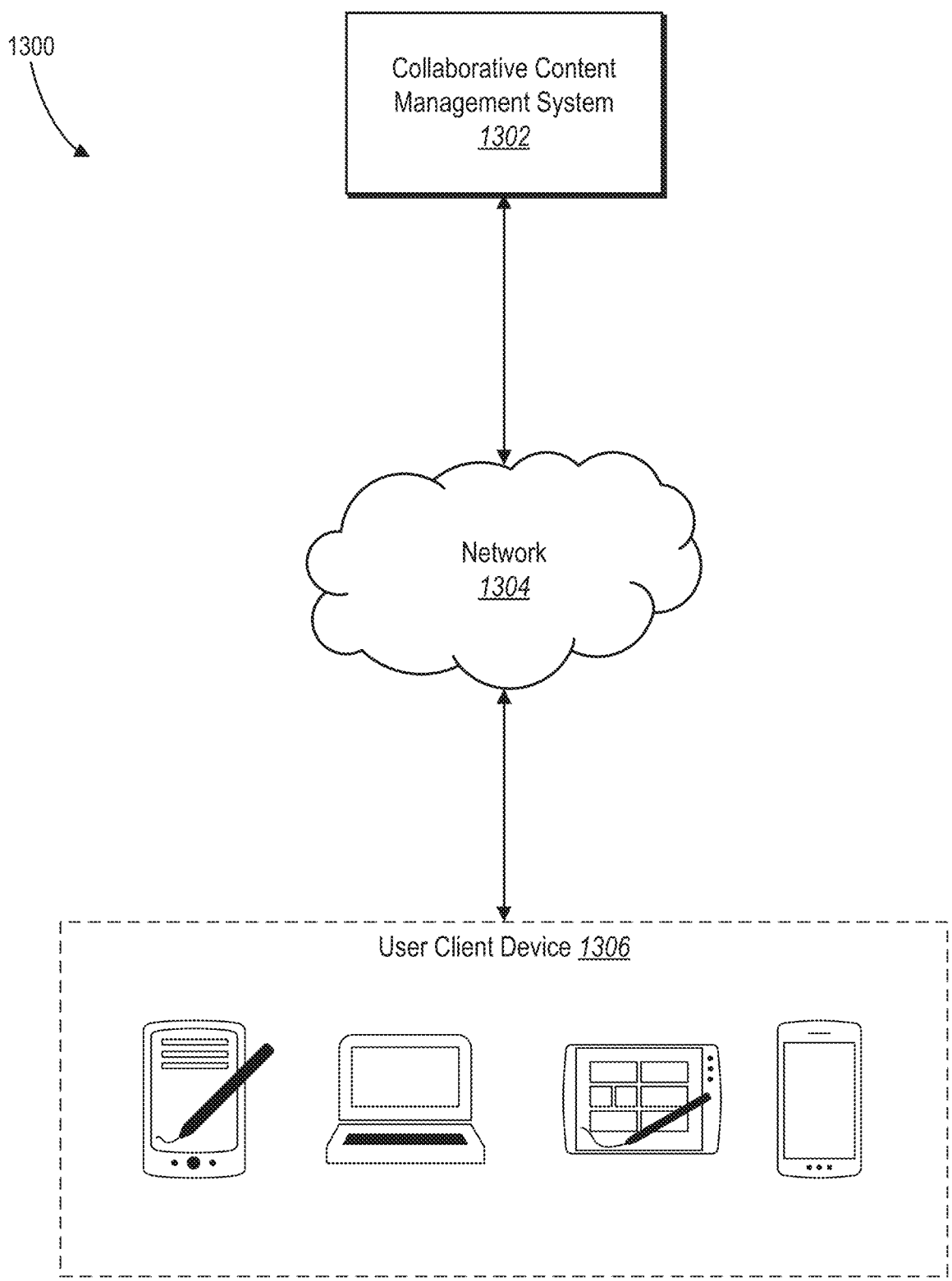
FIG. 13 illustrates an example environment of a networking system having the collaborative content management system in accordance with one or more embodiments.

FIG. 13 is a schematic diagram illustrating environment 1300 within which one or more embodiments of the collaborative content management system 110 can be implemented. Collaborative content management system 1302 may generate, store, manage, receive, and send digital content (such as digital videos). For example, collaborative content management system 1302 may send and receive digital content to and from client devices 1306 by way of network 1304. In particular, collaborative content management system 1302 can store and manage a collection of digital content. Collaborative content management system 1302 can manage the sharing of digital content between computing devices associated with a plurality of users. For instance, collaborative content management system 1302 can facilitate a user sharing a digital content with another user of collaborative content management system 1302.

In particular, collaborative content management system 1302 can manage synchronizing digital content across multiple client devices 1306 associated with one or more users. For example, a user may edit digital content using client device 1306. The collaborative content management system 1302 can cause client device 1306 to send the edited digital content to collaborative content management system 1302. Collaborative content management system 1302 then synchronizes the edited digital content on one or more additional computing devices.

In addition to synchronizing digital content across multiple devices, one or more embodiments of collaborative content management system 1302 can provide an efficient storage option for users that have large collections of digital content. For example, collaborative content management system 1302 can store a collection of digital content on collaborative content management system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from collaborative content management system 1302. In particular, upon a user selecting a reduced-sized version of digital content, client device 1306 sends a request to collaborative content management system 1302 requesting the digital content associated with the reduced-sized version of the digital content. Collaborative content management system 1302 can respond to the request by sending the digital content to client device 1306. Client device 1306, upon receiving the digital content, can then present the digital content to the user. In this way, a user can have access to large collections of digital content while minimizing the amount of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., MICROSOFT WINDOWS INTERNET EXPLORER, MOZILLA FIREFOX, APPLE SAFARI, GOOGLE CHROME, OPERA, etc.) or a native or special-purpose client application (e.g., DROPBOX PAPER for IPHONE or IPAD, DROPBOX PAPER for ANDROID, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access collaborative content management system 1302.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
providing, by a collaborative content management system, a collaborative content management interface comprising a collaborative workspace associated with a folder of files maintained by a file management system, wherein the collaborative workspace comprises a graphical element for each respective file within the folder;
detecting, by the collaborative content management system comprising one or more servers, a user input to add a header at an indicated location within the collaborative workspace;
in response to the detected user input, creating the header at the indicated location within the collaborative workspace below a first subset of graphical elements and above a second subset of graphical elements; and
in response to creating the header at the indicated location within the collaborative workspace, causing the file management system to:
generate, within the folder maintained by the file management system, a subfolder corresponding to the header created within the collaborative workspace; and move files corresponding to the second subset of graphical elements within the collaborative workspace into the generated subfolder within the file management system.

2. The method of claim 1, further comprising:
receiving user input to delete a graphical element from among the second subset of graphical elements; and
in response to the user input to delete the graphical element, causing the file management system to delete, from the subfolder, a file corresponding to the deleted graphical element.

3. The method of claim 1, further comprising:
detecting a second user input to add a second header at a second location within the collaborative workspace, wherein the second location is above the first subset of graphical elements;
in response to the detected second user input to add the second header at the second location, creating the second header at the second location within the collaborative workspace; and
in response to creating the second header at the second location:
 causing the file management system to generate a second subfolder within the folder maintained by the file management system; and
 causing the file management system to move into the second subfolder files that correspond to the second subset of graphical elements.

4. The method of claim 3, further comprising:
detecting a third user input to move the second header from the second location to a third location within the collaborative workspace, wherein the third location is below the first location; and
in response to the detected third user input to move the second header from the second location to the third location within the collaborative workspace:
 moving the second header from the second location to the third location within the collaborative workspace;
 causing the file management system to remove, from the second subfolder, files that correspond to the second subset of graphical elements;
 causing the file management system to maintain, within the subfolder that corresponds to the header at the first location, files that correspond to graphical elements of the first subset of graphical elements that are above the third location and below the first location within the collaborative workspace; and
 causing the file management system to move, from the subfolder that corresponds to the header at the first location and into the second subfolder, files that correspond to graphical elements of the first subset of graphical elements that are below the third location.

5. The method of claim 3, further comprising:
detecting a fourth user input to move a graphical element from a location under the header at the first location to a location under the second header; and
in response to the detected fourth user input to move the graphical element:
 moving the graphical element from the location under the header at the first location to the location under the second header; and
 causing the file management system to move, from the subfolder that corresponds to the header at the first location and into the second subfolder, a file that corresponds to the graphical element that was moved.

6. The method of claim 1, wherein the collaborative content management interface comprises:
 a content management portion whereby a group of users can manage the graphical elements; and
 an activity monitor portion that presents a timeline of user activity that takes place within the collaborative content management interface and that updates the timeline as the user activity occurs.

7. The method of claim 1, wherein:
detecting the user input to add the header within the collaborative workspace comprises receiving text input for a name of the header; and
causing the file management system to generate the subfolder comprises causing the file management system to name the subfolder to match the name of the header.

8. A system comprising:
at least one processor; and
a non-transitory computer readable medium comprising instructions that, when executed by the at least one processor, cause the system to:
 provide a collaborative content management interface comprising a collaborative workspace associated with a folder of files maintained by a file management system, wherein the collaborative workspace comprises a graphical element for each respective file within the folder;
 detect, by at least one processor, a user input to add a header at an indicated location within the collaborative workspace;
 in response to the detected user input, creating the header at the indicated location within the collaborative workspace below a first subset of graphical elements and above a second subset of graphical elements; and
 in response to creating the header at the indicated location within the collaborative workspace, cause the file management system to:
  generate, within the folder maintained by the file management system, a subfolder corresponding to the header created within the collaborative workspace; and
  move files corresponding to the second subset of graphical elements within the collaborative workspace into the generated subfolder within the file management system.

9. The system of claim 8, further comprising instructions that, when executed by the at least one processor, cause the system to:
receive user input to delete a graphical element from among the second subset of graphical elements; and
in response to the user input to delete the graphical element, cause the file management system to delete, from the subfolder, a file corresponding to the deleted graphical element.

10. The system of claim 8, further comprising instructions that, when executed by the at least one processor, cause the system to:
detect a second user input to add a second header at a second location within the collaborative workspace, wherein the second location is above the first subset of graphical elements;

in response to the detected second user input to add the second header at the second location, create the second header at the second location within the collaborative workspace; and in response to creating the second header at the second location:
    cause the file management system to generate a second subfolder within the folder maintained by the file management system; and
    cause the file management system to move into the second subfolder files that correspond to the second subset of graphical elements.

11. The system of claim 10, further comprising instructions that, when executed by the at least one processor, cause the system to:

detect a third user input to move the second header from the second location to a third location within the collaborative workspace, wherein the third location is below the first location; and in response to the detected third user input to move the second header from the second location to the third location within the collaborative workspace:
    move the second header from the second location to the third location within the collaborative workspace;
    cause the file management system to remove, from the second subfolder, files that correspond to the second subset of graphical elements;
    cause the file management system to maintain, within the subfolder that corresponds to the header at the first location, files that correspond to graphical elements of the first subset of graphical elements that are above the third location and below the first location within the collaborative workspace; and
    cause the file management system to move, from the subfolder that corresponds to the header at the first location and into the second subfolder, files that correspond to graphical elements of the first subset of graphical elements that are below the third location.

12. The system of claim 8, further comprising instructions that, when executed by the at least one processor, cause the system to:

detect a fourth user input to delete the header within the collaborative workspace; and in response to the detected fourth user input to delete the header:
    cause the file management system to move, from the generated subfolder and into the folder maintained by the file management system, the files that correspond to the second subset of graphical elements;
    delete the header within the collaborative workspace; and
    cause the file management system to delete the subfolder within the folder maintained by the file management system and that corresponds to the deleted header.

13. The system of claim 8, wherein the collaborative content management interface comprises:

a content management portion whereby a group of users can manage the graphical elements; and an activity monitor portion that presents a timeline of user activity that takes place within the collaborative content management interface and that updates the timeline as the user activity occurs.

14. The system of claim 8, wherein:

detecting the user input to add the header within the collaborative workspace comprises receiving text input for a name of the header; and causing the file management system to generate the subfolder comprises causing the file management system to name the subfolder to match the name of the header.

15. A non-transitory computer readable medium comprising instructions that, when executed by at least one processor, cause a computing device to:

provide, by a collaborative content management system, a collaborative content management interface comprising a collaborative workspace associated with a folder of files maintained by a file management system, wherein the collaborative workspace comprises a graphical element for each respective file within the folder;

detect, by the collaborative content management system comprising one or more servers, a user input to add a header at an indicated location within the collaborative workspace;

in response to the detected user input, create the header at the indicated location within the collaborative workspace below a first subset of graphical elements and above a second subset of graphical elements; and in response to creating the header at the indicated location within the collaborative workspace, cause the file management system to:
    generate, within the folder maintained by the file management system, a subfolder corresponding to the header created within the collaborative workspace; and
    move files corresponding to the second subset of graphical elements within the collaborative workspace into the generated subfolder within the file management system.

16. The non-transitory computer readable medium of claim 15, further comprising instructions that, when executed by the at least one processor, cause the computing device to:

receive user input to delete a graphical element from among the second subset of graphical elements; and in response to the user input to delete the graphical element, cause the file management system to delete, from the subfolder, a file corresponding to the deleted graphical element.

17. The non-transitory computer readable medium of claim 15, further comprising instructions that, when executed by the at least one processor, cause the computing device to:

detect a second user input to add a second header at a second location within the collaborative workspace, wherein the second location is above the first subset of graphical elements;

in response to the detected second user input to add the second header at the second location, create the second header at the second location within the collaborative workspace; and in response to creating the second header at the second location:
    cause the file management system to generate a second subfolder within the folder maintained by the file management system; and
    cause the file management system to move into the second subfolder files that correspond to the second subset of graphical elements.

18. The non-transitory computer readable medium of claim 17, further comprising instructions that, when executed by the at least one processor, cause the computing device to:
- detect a third user input to move the second header from the second location to a third location within the collaborative workspace, wherein the third location is below the first location; and
- in response to the detected third user input to move the second header from the second location to the third location within the collaborative workspace:
  - move the second header from the second location to the third location within the collaborative workspace;
  - cause the file management system to remove, from the second subfolder, files that correspond to the second subset of graphical elements;
  - cause the file management system to maintain, within the subfolder that corresponds to the header at the first location, files that correspond to graphical elements of the first subset of graphical elements that are above the third location and below the first location within the collaborative workspace; and
  - cause the file management system to move, from the subfolder that corresponds to the header at the first location and into the second subfolder, files that correspond to graphical elements of the first subset of graphical elements that are below the third location.

19. The non-transitory computer readable medium of claim 17, further comprising instructions that, when executed by the at least one processor, cause the computing device to:
- detect a fourth user input to move a graphical element from a location under the header at the first location to a location under the second header; and
- in response to the detected fourth user input to move the graphical element:
  - move the graphical element from the location under the header at the first location to the location under the second header; and
  - cause the file management system to move, from the subfolder that corresponds to the header at the first location and into the second subfolder, a file that corresponds to the graphical element that was move.

20. The non-transitory computer readable medium of claim 15, wherein the collaborative content management interface comprises:
- a content management portion whereby a group of users can manage the graphical elements; and
- an activity monitor portion that presents a timeline of user activity that takes place within the collaborative content management interface and that updates the timeline as the user activity occurs.

* * * * *